US010114550B2

(12) United States Patent
Ryu et al.

(10) Patent No.: US 10,114,550 B2
(45) Date of Patent: Oct. 30, 2018

(54) DATA STORAGE DEVICE AND DATA PROCESSING SYSTEM INCLUDING THE DATA STORAGE DEVICE

(71) Applicant: SAMSUNG ELECTRONICS CO., LTD., Suwon-si, Gyeonggi-do (KR)

(72) Inventors: In-Sik Ryu, Yongin-si (KR); Tae Min Lee, Seongnam-si (KR); Da Woon Jung, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 112 days.

(21) Appl. No.: 15/277,496

(22) Filed: Sep. 27, 2016

(65) Prior Publication Data
US 2017/0199672 A1 Jul. 13, 2017

(30) Foreign Application Priority Data

Jan. 7, 2016 (KR) .................. 10-2016-0002310
Jan. 22, 2016 (KR) .................. 10-2016-0008160

(51) Int. Cl.
*G06F 3/06* (2006.01)
*G06F 9/4401* (2018.01)
*G06F 12/06* (2006.01)

(52) U.S. Cl.
CPC .......... *G06F 3/0607* (2013.01); *G06F 3/0659* (2013.01); *G06F 3/0679* (2013.01); *G06F 9/4408* (2013.01); *G06F 12/0638* (2013.01); *G06F 2212/205* (2013.01)

(58) Field of Classification Search
CPC .... G06F 9/4408; G06F 3/0607; G06F 3/0659; G06F 3/0679
See application file for complete search history.

(56) References Cited

U.S. PATENT DOCUMENTS

| | | | |
|---|---|---|---|
| 6,513,114 B1* | 1/2003 | Wu | ........................ G06F 9/4411 713/2 |
| 7,702,952 B2 | 4/2010 | Tarra et al. | |
| 8,261,133 B1 | 9/2012 | Ali-Santosa et al. | |
| 8,281,062 B2 | 10/2012 | Hahn et al. | |
| 8,732,387 B2 | 5/2014 | Chen et al. | |
| 8,793,530 B2 | 7/2014 | Brown et al. | |
| 8,805,793 B2 | 8/2014 | Patiejunas et al. | |
| 8,904,084 B2 | 12/2014 | Lim et al. | |
| 8,909,855 B2 | 12/2014 | Nemazie | |
| 2009/0083476 A1 | 3/2009 | Pua et al. | |
| 2010/0115175 A9 | 5/2010 | Zhuang et al. | |
| 2012/0079171 A1 | 3/2012 | Ju et al. | |
| 2016/0062698 A1* | 3/2016 | Wu | ........................ G06F 3/061 714/6.2 |

* cited by examiner

*Primary Examiner* — Edward J Dudek, Jr.
(74) *Attorney, Agent, or Firm* — Volentine, Whitt & Francos, PLLC

(57) ABSTRACT

A data storage device includes a first volatile memory device, a first scale-out storage, and a first controller. The first controller is configured to control the first volatile memory device and the first scale-out storage and to execute first firmware. The first scale-out storage includes a second volatile memory device, a first non-volatile memory device, and a second controller. The second controller is configured to control the second volatile memory device and the first non-volatile memory device and to execute second firmware. The first controller boots the first firmware after booting of the second firmware is completed by the second controller.

18 Claims, 14 Drawing Sheets

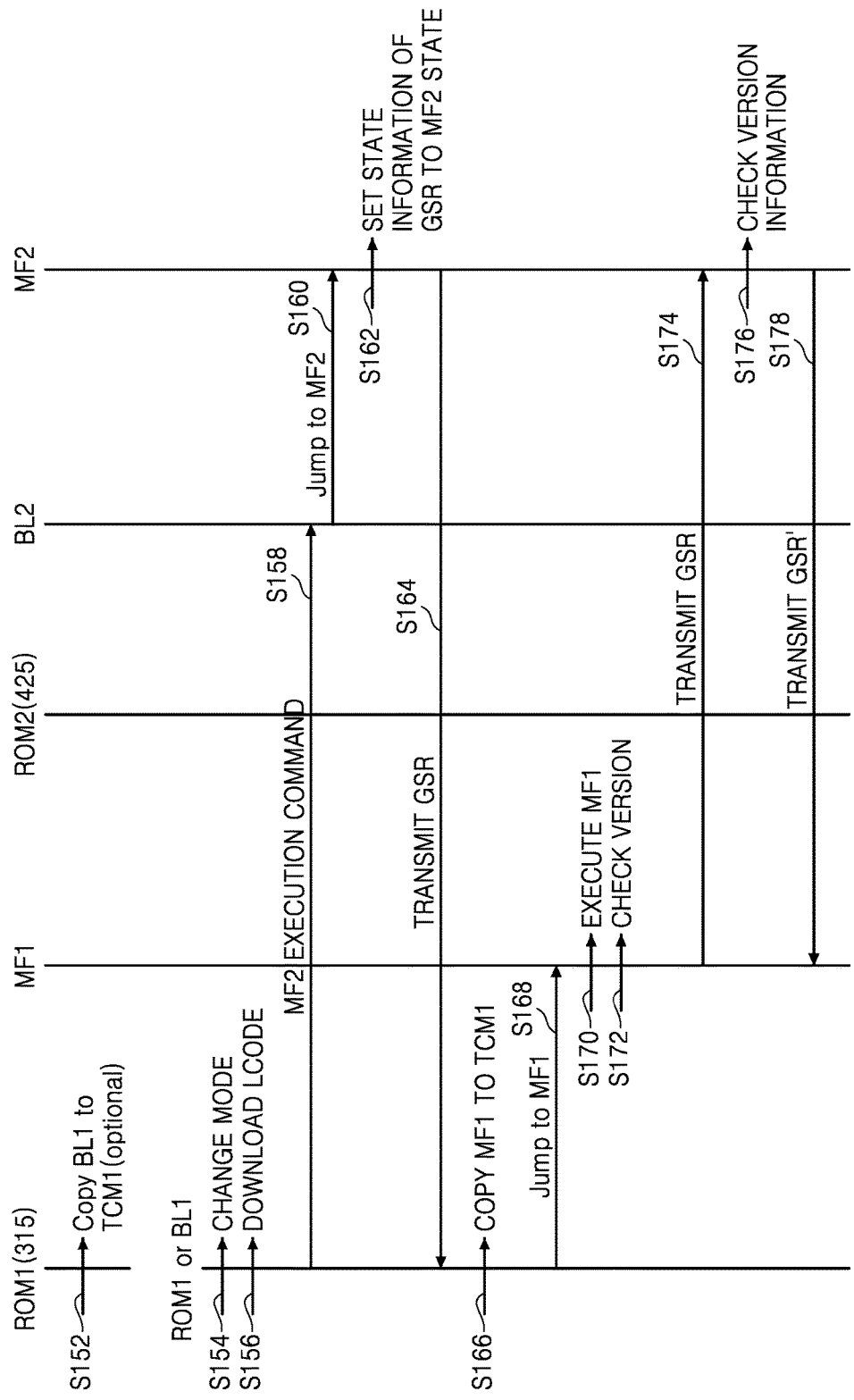

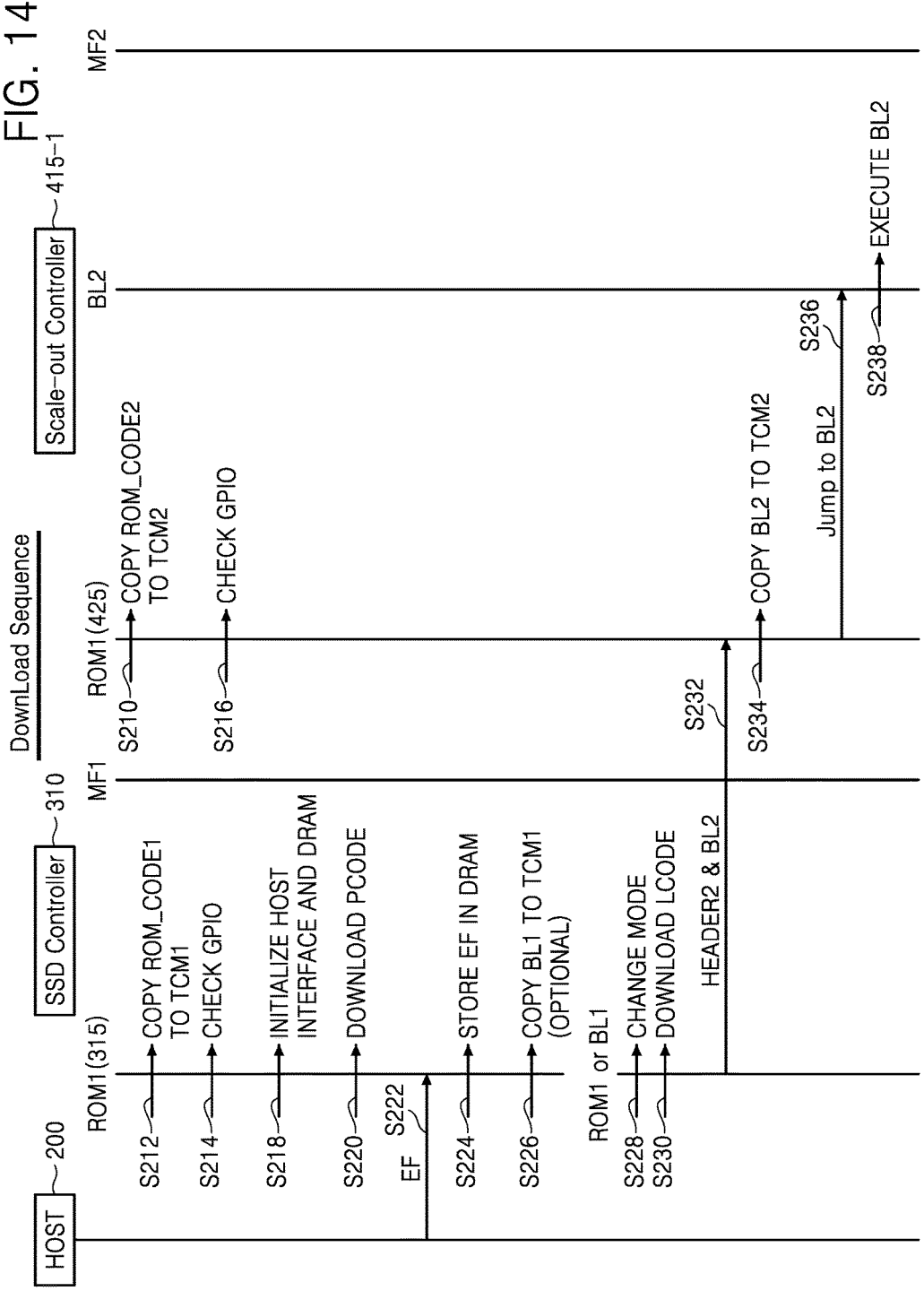

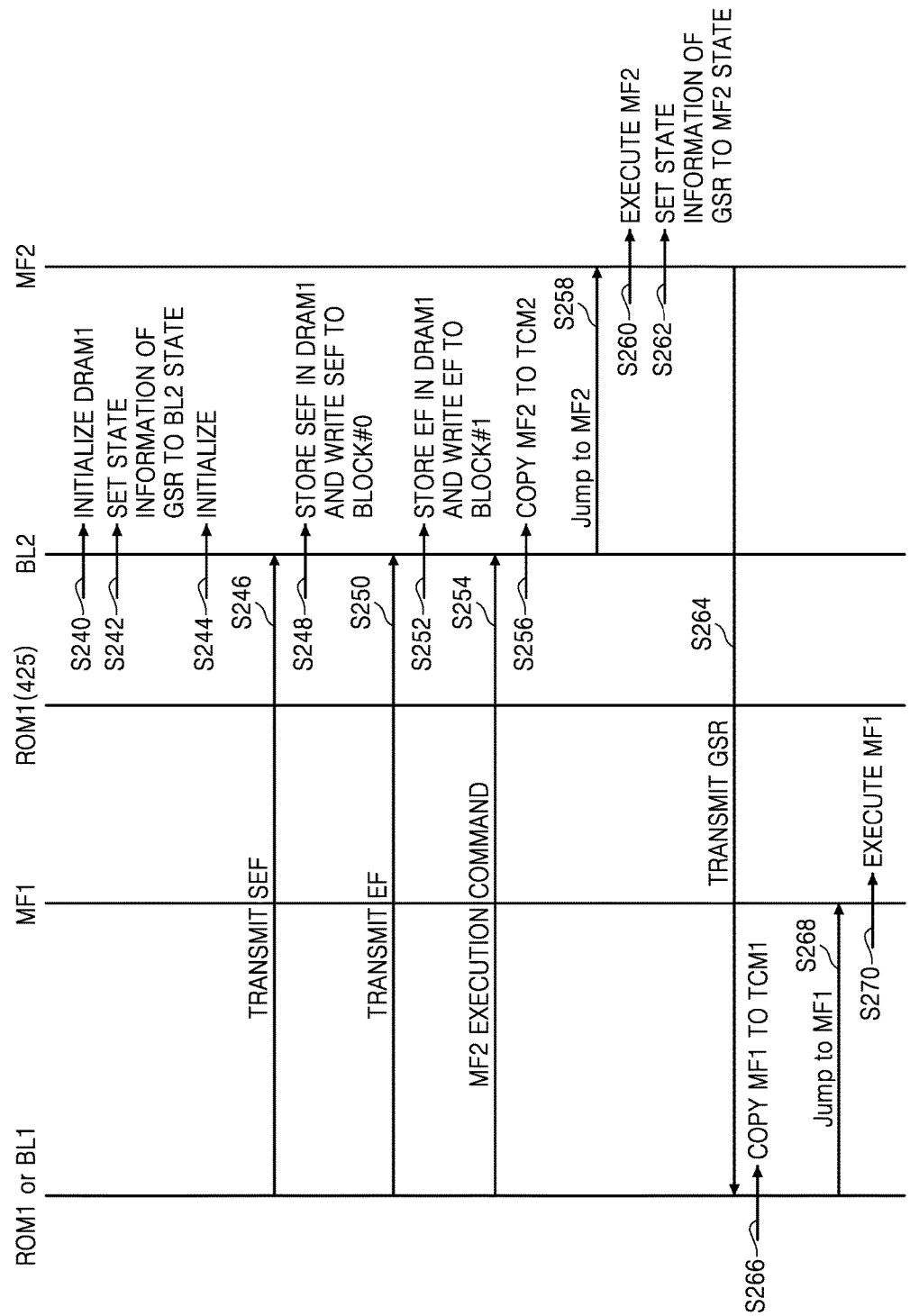

DATA STORAGE DEVICE AND DATA PROCESSING SYSTEM INCLUDING THE DATA STORAGE DEVICE

CROSS-REFERENCE TO RELATED APPLICATIONS

This application claims priority under 35 U.S.C. § 119 to Korean Patent Application Nos. 10-2016-0002310, filed on Jan. 7, 2016, and 10-2016-0008160, filed Jan. 22, 2016, in the Korean Intellectual Property Office (KIPO), the entire contents of which are incorporated herein by reference.

BACKGROUND

Field of the Disclosure

Embodiments of the present disclosure relate to a data storage device. More particularly, the present disclosure relates to a data storage device that performs a booting sequence and a download sequence of firmware with controllers using different firmware, and to a data processing system that includes the data storage device.

Background Information

Memory devices are used to store data and are divided into volatile memory devices and non-volatile memory devices. A flash memory device is an example of electrically erasable programmable read-only memory (EEPROM) in which multiple memory cells are erased or programmed in a single program operation.

In order to increase the capacity of conventional drives including non-volatile memory devices (e.g., flash memory devices), the number of non-volatile memory devices is increased. When the number of non-volatile memory devices included in a drive increases, the capacity (or size) of a mapping table that includes information for translating logical addresses into physical addresses needs to be increased. However, when the capacity of memory storing a mapping table and the processing speed of the memory are considered, the number of non-volatile memory devices cannot be increased unlimitedly.

Scale-up or scale-out is used to increase the data processing performance of a data storage device, e.g. a data server. Scale-up is a method of increasing the data processing performance of a data server by increasing the capacity of the data server itself and is referred to as vertical scaling. Scale-out is a method of increasing the data processing performance of a system including a data server by increasing the number of connected data servers and is referred to as horizontal scaling.

When the number of non-volatile memory devices increases in a data storage device having scale-up architecture, loading capacitance of an interface between the non-volatile memory devices and a controller which controls the non-volatile memory devices increases. As a result, the data processing speed of the data storage device may decrease.

SUMMARY

According to an aspect of the present disclosure, an exemplary embodiment of the present disclosure is directed to a data storage device, a first volatile memory device, a first scale-out storage, and a first controller configured to control the first volatile memory device and the first scale-out storage and to execute first firmware. The first scale-out storage includes a second volatile memory device, a first non-volatile memory device, and a second controller. The second controller is configured to control the second volatile memory device and the first non-volatile memory device, and to execute second firmware. The first controller boots the first firmware after booting of the second firmware is completed by the second controller.

According to another aspect of the present disclosure, the data storage device further includes a power management integrated circuit. configured to supply a second operating voltage to the first scale-out storage at a second supply point and supply a first operating voltage to the first controller at a first supply point. The second supply point comes earlier than the first supply point.

According to still another aspect of the present disclosure, the first non-volatile memory device includes a first block and a second block. The first block is configured to store second full-firmware which includes a second boot loader and the second firmware. The second block is configured to store first full-firmware which includes the first firmware, the second boot loader, and the second firmware.

According to yet another aspect of the present disclosure, the first non-volatile memory device includes multiple memory cells. Each of the memory cells is either of a two-dimensional memory cell and a three-dimensional memory cell.

According to another aspect of the present disclosure, the second controller loads the second boot loader from the first block to the second controller in response to a first physical read command output from the first controller. The second controller transmits the first full-firmware from the second block to the first controller using the second boot loader. The second controller also loads the second firmware from the first block to the second controller using the second boot loader. Commands involved in the transmission of the first full-firmware are second physical read commands including the first physical read command.

According to still another aspect of the present disclosure, the second controller loads the second boot loader from the first block to the second controller without using the second volatile memory device. The second controller initializes the second volatile memory device using the second boot loader. The second controller also transmits the first full-firmware to the first controller via the second volatile memory device, and loads the second firmware to the second controller via the second volatile memory device.

According to yet another aspect of the present disclosure, the first controller stores the first full-firmware transmitted from the second controller in the first volatile memory device. The first controller also changes its own operating mode from a physical mode operating based on a physical address to a logical mode operating based on a logical address. The first controller transmits an execution command to execute the second firmware to the second controller.

According to another aspect of the present disclosure, the second controller executes the second firmware in response to the execution command and transmits an indicator signal indicating the execution of the second firmware to the first controller. The first controller loads the first firmware included in the first full-firmware stored in the first volatile memory device in response to the indicator signal and executes the first firmware.

According to still another aspect of the present disclosure, the first controller which executes the first firmware transmits a version check command to the second controller. The second controller transmits version information of the second firmware to the first controller in response to the version check command.

According to yet another aspect of the present disclosure, the first controller receives first full-firmware which includes the first firmware, a second boot loader, and the second firmware from an external device connected to the first controller. The first controller stores the first full-firmware in the first volatile memory device. The first controller also changes its own operating mode from a physical mode operating based on a physical address to a logical mode operating based on a logical address. The first controller also transmits the second boot loader to the second controller using a first logical command. The second controller initializes the second volatile memory device using the second boot loader.

According to another aspect of the present disclosure, the first controller transmits second full-firmware to the second controller using a second logical command. The second full-firmware includes the second boot loader and the second firmware. The second controller writes the second full-firmware to a first block of the first non-volatile memory device via the second volatile memory device. The first controller transmits the first full-firmware to the second controller using a third logical command. The second controller writes the first full-firmware to a second block of the first non-volatile memory device via the second volatile memory device.

According to still another aspect of the present disclosure, the first controller transmits an execution command indicating execution of the second firmware to the second controller. The second controller loads and executes the second firmware included in the second full-firmware stored in the second volatile memory device in response to the execution command and transmits an indicator signal indicating that the second firmware is executed to the first controller. The first controller loads the first firmware included in the first full-firmware stored in the first volatile memory device in response to the indicator signal and executes the first firmware.

According to yet another aspect of the present disclosure, the external device is either of a host and a second scale-out storage. The second scale-out storage includes a third volatile memory device, a second non-volatile memory device and a third controller. The second non-volatile memory device is configured to store the first full-firmware. The third controller is configured to control the third volatile memory device and the second non-volatile memory device.

According to another aspect of the present disclosure, the first controller includes first general-purpose input/output (GPIO) pins, and the second controller includes second GPIO pins. The first GPIO pins are connected with the second GPIO pins, respectively. Each of the first and second controllers checks a state of one of the first GPIO pins and determines whether an operating mode of the data storage device is a boot mode or a download mode.

According to still another aspect of the present disclosure, the first non-volatile memory device includes a first block and a second block. The first block is configured to store second full-firmware which includes a second boot loader and the second firmware. The second block is configured to store first full-firmware which includes the first firmware, the second boot loader, and the second firmware. When the operating mode is the boot mode, the second controller transmits the first full-firmware stored in the second block to the first controller, loads the second firmware stored in the first block to the second controller, executes the second firmware in response to an execution command indicating execution of the second firmware, and transmits an indicator signal indicating that the second firmware is executed to the first controller. The first controller downloads the first firmware included in the first full-firmware in response to the indicator signal and executes the first firmware.

According to yet another aspect of the present disclosure, the first non-volatile memory device includes a first block and a second block. When the operating mode is the download mode, the first controller receives first full-firmware from an external device connected to the first controller. The first full-firmware includes the first firmware, a second boot loader, and the second firmware. The first controller then stores the first full-firmware in the first volatile memory device, and transmits second full-firmware to the second controller. The second full-firmware includes the second boot loader and the second firmware. The second controller writes the second full-firmware to the first block. The first controller transmits the first full-firmware to the second controller. The second controller then writes the first full-firmware to the second block, executes the second firmware in response to an execution command output from the first controller to indicate execution of the second firmware, and transmits an indicator signal indicating that the second firmware is executed to the first controller. The first controller downloads the first firmware included in the first full-firmware stored in the first volatile memory device in response to the indicator signal and executes the first firmware.

According to an aspect of the present disclosure, an exemplary embodiment of the present disclosure is directed to a data storage device. The data storage device includes a first volatile memory device, scale-out storages, and a first controller configured to control the first volatile memory device and the scale-out storages. Each scale-out storage includes a second volatile memory device, a non-volatile memory device, and a second controller. The second controller is configured to control the second volatile memory device and the non-volatile memory device. The first controller executes first firmware. The second controller included in each scale-out storage executes second firmware. The first controller executes the first firmware after the second firmware is executed by each of second controllers included in the respective scale-out storages.

According to an aspect of the present disclosure, an exemplary embodiment of the present disclosure is directed to a data processing system. The data processing system includes a host and a data storage device connected to the host. The data storage device includes a first volatile memory device, a scale-out storage, and a first controller. The first controller is configured to control the first volatile memory device and the scale-out storage and to execute first firmware. The scale-out storage includes a second volatile memory device, a non-volatile memory device, and a second controller. The second controller is configured to control the second volatile memory device and the non-volatile memory device and to execute second firmware. The first controller boots the first firmware after booting of the second firmware is completed by the second controller.

BRIEF DESCRIPTION OF THE DRAWINGS

The above and other features and advantages will become more apparent by describing in detail exemplary embodiments with reference to the attached drawings in which:

FIGS. 12 and 13 are conceptual diagrams for explaining a boot sequence of the data processing system illustrated in FIG. 1;

FIGS. 14 and 15 are conceptual diagrams for explaining a firmware download sequence of the data processing system illustrated in FIG. 1.

DETAILED DESCRIPTION OF THE EMBODIMENTS

Figure 1:
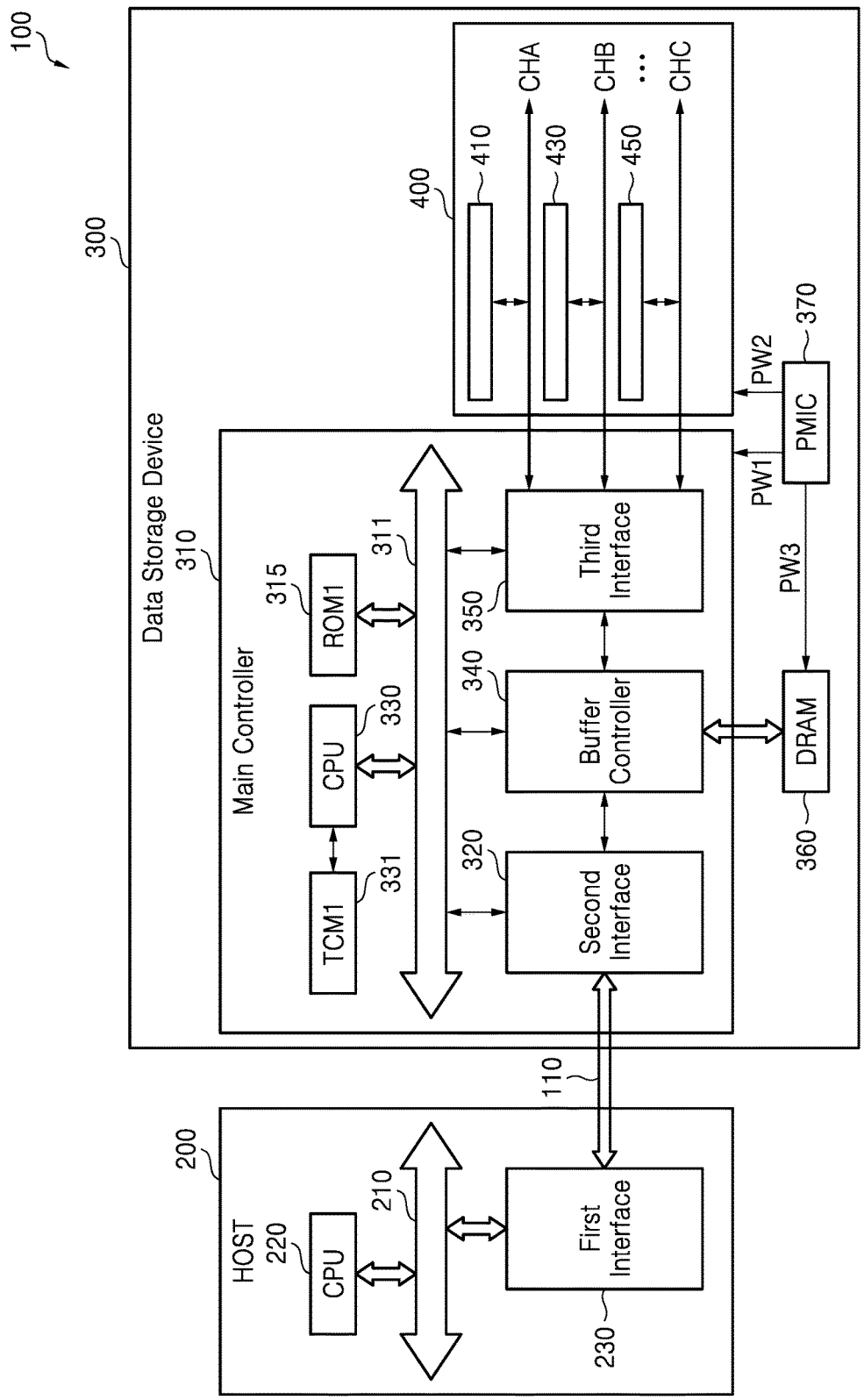
FIG. 1 is a block diagram of a data processing system according to some embodiments of the present disclosure.

The concepts of the present disclosure now will be described more fully hereinafter with reference to the accompanying drawings, in which embodiments are shown. The concepts of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of a data processing system 100 according to some embodiments of the present disclosure. Referring to FIG. 1, the data processing system 100 may include a host 200 and a data storage device 300 which communicates (transmits and receives) signals with the host 200 via an interface 110. When a first cluster 410 included in the data storage device 300 has a structure illustrated in FIG. 3, the data storage device 300 may have scale-out architecture. For example, the data processing system 100 may be a memory system.

In some embodiments, the data processing system 100 including a memory cluster 400 may be implemented as a personal computer (PC), a workstation, a data center, an internet data center (IDC), a direct attached storage (DAS), a storage area network (SAN), a network-attached storage (NAS), or a mobile computing device, but the data processing systems described herein are not restricted to these examples. The data processing system 100 including the memory cluster 400 may be a smart car or an automotive system.

The mobile computing device may be a laptop computer, a cellular phone, a smart phone, a tablet PC, a personal digital assistant (PDA), an enterprise digital assistant (EDA), a digital still camera, a digital video camera, a portable multimedia player (PMP), a multimedia device, a personal navigation device or portable navigation device (PND), a mobile internet device (MID), a wearable computer, an internet of things (IoT) device, an internet of everything (IoE) device, or a drone.

The interface 110 may be a serial advanced technology attachment (SATA) interface, a SATA express (SATAe) interface, a SAS (serial attached small computer system interface (SCSI)), a peripheral component interconnect express (PCIe) interface, a non-volatile memory express (NVMe) interface, an advanced host controller interface (AHCI), or a multimedia card (MMC) interface, but it is not restricted these examples. The interface 110 may transmit electrical or optical signals.

The host 200 may control a data processing operation (e.g., a write or read operation) of the data storage device 300 via the interface 110. The host 200 may be a host controller. The host 200 may transmit firmware to the data storage device 300.

A central processing unit (CPU) 220 and a first interface 230 may communicate signals with each other via a transmission medium (e.g., transmission lines or a bus) 210. Although the host 200 includes the transmission medium 210, the CPU 220, and the first interface 230 in the embodiments illustrated in FIG. 1, the hosts described herein are not restricted to the current embodiments. The host 200 may be implemented as an integrated circuit (IC), a motherboard, a system on chip (SoC), an application processor (AP), a mobile AP, a web server, a data server, a database server, or an engine control unit (ECU), but the hosts described herein are not restricted to these examples.

For example, the transmission medium 210 may be implemented as an advanced microcontroller bus architecture (AMBA), an advanced high-performance bus (AHB), an advanced peripheral bus (APB), an advanced extensible interface (AXI), an advanced system bus (ASB), AXI coherency extensions (ACE), or a combination thereof, but the transmission mediums described herein are not restricted to these examples.

The CPU 220 may generate a write request for controlling a write operation of the data storage device 300 or a read request for controlling a read operation of the data storage device 300. The write request may include a write address and the read request may include a read address. The CPU 220 may include at least one core. The request may be a command. When firmware for the data storage device 300 needs to be updated, the CPU 220 may transmit the firmware to the data storage device 300.

The first interface 230 may change the format of signals to be transmitted to the data storage device 300 and may transmit the signals in a changed format to the data storage device 300 through the interface 110. The first interface 230 may also change the format of signals received from the data storage device 300 and may transmit the signals in a changed format to the CPU 220 through the transmission medium 210. The first interface 220 may include a transceiver which transmits and receives signals. The structure and operations of the first interface 230 may be configured to be compatible with those of the interface 110.

The data storage device 300 may include a main controller 310, a (volatile) dynamic random access memory (DRAM) device 360, a power management IC (PMIC) 370, and the memory cluster 400. The memory cluster 400 may be a group of scale-out storages or memory devices. The memory cluster 400 may include scale-out devices and memory devices.

The data storage device 300 may be a flash-based memory device but is not restricted thereto. For example, the data storage device 300 may be implemented as a solid-state drive or solid-state disk (SSD), an embedded SSD (eSSD), a universal flash storage (UFS), an MMC, an embedded MMC (eMMC), or managed NAND, but the data storage devices described herein are not restricted to these examples. The flash-based memory device may be a NAND-type flash memory device or a NOR-type flash memory device. Alternatively, the data storage device 300 may be implemented as a hard disk drive (HDD), a phase-change random access memory (PRAM) device, a magnetoresistive RAM (MRAM) device, a spin-transfer torque MRAM (STT-MRAM) device, a ferroelectric RAM (FRAM) device, or a resistive RAM (RRAM) device, but the data storage devices described herein are not restricted to these examples.

The main controller 310 may control transfer (or processing) of signals among the host 200, the DRAM device 360, and the memory cluster 400. The main controller 310 may be implemented in an IC or a SoC and may be referred to as a first controller or an SSD controller.

The main controller 310 may include a transmission medium 311, a first read-only memory (ROM) 315, a second interface 320, a CPU 330, a first internal memory device 331, a buffer controller 340, and a third interface 350. The transmission medium (e.g., transmission lines or a bus) 311 may be implemented as AMBA, AHB, APB, AXI, ASB, ACE, or combination thereof, but the transmission mediums described herein are not restricted to these examples.

The first ROM 315 may store data necessary for the operations of the main controller 310. The first ROM 315 may store a first ROM code. The first ROM 315 may be implemented as a mask ROM or a serial NOR flash memory device.

The first internal memory device 331 may store the first ROM code or a first flash translation layer (FTL) code which can be executed by the CPU 330. For example, when the data storage device 300 is booted, the first ROM code may be loaded from the first ROM 315 to the first internal memory device 331 and the first FTL code may be loaded from the memory cluster 400 to the first internal memory device 331.

The first internal memory device 331 may be implemented as RAM, DRAM, static RAM (SRAM), buffer, buffer memory, cache, or tightly couple memory (TCM), but the memory devices described herein are not restricted to these examples. It is assumed that the first internal memory device 331 is a first TCM and the first TCM 331 is implemented as SRAM.

The second interface 320 may change the format of signals to be transmitted to the host 200 and may transmit the signals in a changed format to the host 200 through the interface 110. The second interface 320 may also receive signals from the host 200, change the format of the signals, and transmit signals in a changed format to the CPU 330 and/or the buffer controller 340. The second interface 320 may include a transceiver which transmits and receives signals. The second interface 320 may be used as a host interface.

The structure and operations of the second interface 320 may be configured to be compatible with those of the interface 110. The second interface 320 may be SATA interface, SATAe interface, SAS, PCIe interface, NVMe interface, AHCI, MMC interface, NAND-type flash memory interface, or NOR-type flash memory interface but is not restricted thereto.

The CPU 330 may control the first ROM 315, the first TCM 331, the second interface 320, the buffer controller 340, and the third interface 350 through the transmission medium 311. The CPU 330 may include at least one core. The CPU 330 may also control the PMIC 370.

For example, when the CPU 330 is defined as a collective concept that includes a first CPU and a second CPU, the first CPU may transmit and receive signals to and from the host 200 via the second interface 320 and the second CPU may transmit and receive signals to and from the memory cluster 400 via the third interface 350. For example, the first CPU and the second CPU may form multi-CPU. The first CPU may control the second CPU, but the CPUs described in the present disclosure are not restricted to the current embodiments.

The buffer controller 340 may write data to or read data from the DRAM device 360 according to the control of the CPU 330 or the control of firmware (e.g., first firmware) executed in the CPU 330. The buffer controller 340 may be called a controller or a buffer manager that controls the write and read operations of the DRAM device 360.

The third interface 350 may control a data processing operation (e.g. a write or read operation) of the memory cluster 400 through one of main channels CHA, CHB, and CHC according to the control of the CPU 330 or the control of firmware (e.g., first ROM code or first firmware) executed in the CPU 330. The third interface 350 may be SATA interface, SATAe interface, SAS, PCIe interface, NVMe interface, AHCI, MMC interface, NAND-type flash memory interface, or NOR-type flash memory interface but is not restricted thereto.

The third interface 350 may include an error correction code (ECC) engine (not shown). The ECC engine may correct errors in data to be stored in the memory cluster 400 or in data output from the memory cluster 400. The ECC engine may be implemented in any place inside the main controller 310 in other embodiments.

The DRAM device 360 may write data or read data according to the control of the buffer controller 340. The DRAM device 360 may be an embodiment of a volatile memory device. The DRAM device 360 may include a first region which stores a mapping table for logical address-to-physical address translation with respect to clusters 410, 430, and 450 and a second region which functions as a cache, but the DRAM devices described herein are not restricted to the current embodiments. The first FTL code executed by the CPU 330 may perform logical address-to-physical address translation using the mapping table stored in the first region.

When the main controller 310 and the DRAM device 360 are formed in different semiconductor chips, respectively; the main controller 310 and the DRAM device 360 may be implemented in a single package such as package-on-package (PoP) structure, multi-chip package (MCP) structure, or system-in package (SiP) structure, but the main controllers and DRAM devices described herein are not restricted to these examples. A first semiconductor chip (or package) including the DRAM device 360 may be stacked above a second semiconductor chip (or package) including the main controller 310 using stack balls.

The PMIC 370 may control operating voltages respectively supplied to the main controller 310, the DRAM device 360, and the memory cluster 400. A first operating voltage PW1 supplied to the main controller 310, a second operating voltage PW2 supplied to the memory cluster 400, and a third operating voltage PW3 supplied to the DRAM device 360 may be the same as or different from one another.

Figure 6:
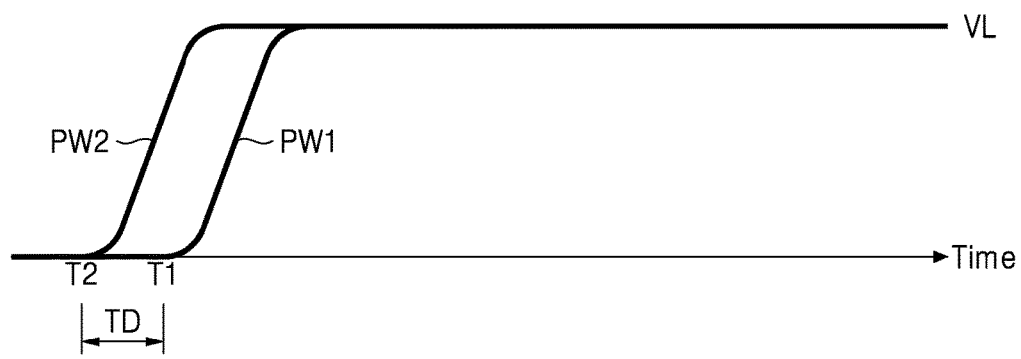
FIG. 6 is a diagram of the power sequence of the data storage device illustrated in FIG. 1.

As shown in FIG. 6, a first supply point T1 of the first operating voltage PW1 lags behind a second supply point T2 of the second operating voltage PW2. In other words, there is a time difference TD between two supply points T2 and T1. The power sequence of the second operating voltage PW2 leads the power sequence of the first operating voltage PW1. Although the operating voltages PW1 and PW2 have the same level VL in the embodiments illustrated in FIG. 6, they may have different levels in other embodiments.

The memory cluster 400 may include multiple clusters 410, 430, and 450. The first cluster 410 may be connected to the first main channel CHA, the second cluster 430 may be connected to the second main channel CHB, and the third cluster 450 may be connected to the third main channel CHC. The structure of each of the clusters 410, 430, and 450 will be described in detail with reference to FIGS. 2 through 5. Each of the clusters 410, 430, and 450 may include multiple scale-out storages. Each of the clusters 410, 430, and 450 may include at least one scale-out device and multiple non-volatile memory devices.

A main channel or a channel may refer to an independent data path existing between the third interface 350 of the main controller 310 and each of the clusters 410, 430, and 450. The data path may include transmission lines that transmit data and/or control signals. The term "way" may refer to a non-volatile memory device or a group of non-volatile memory devices sharing one main channel or one channel. Accordingly, multiple ways may be connected to one main channel or one channel. A non-volatile memory device may refer to a die, a memory device, or a memory package. The main controller 310 may control A-channel*B-way, where A and B are natural numbers of at least 1.

Each non-volatile memory device may include a memory cell array. The memory cell array may include multiple memory cells. The memory cell array may include a two-dimensional (2D) memory cell array or a three-dimensional (3D) memory array. Each memory cell may be a 2D memory cell or a 3D memory cell.

The 3D memory array is monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array. In an embodiment, the 3D memory array includes vertical NAND strings that are vertically oriented such that at least one memory cell is located over another memory cell. The at least one memory cell may comprise a charge trap layer. The following patent documents, which are hereby incorporated by reference, describe suitable configurations for three-dimensional memory arrays, in which the three-dimensional memory array is configured as multiple levels, with word lines and/or bit lines shared between levels: U.S. Pat. Nos. 7,679,133; 8,553,466; 8,654,587; 8,559,235; and US Pat. Pub. No. 2011/0233648.

Figure 2:
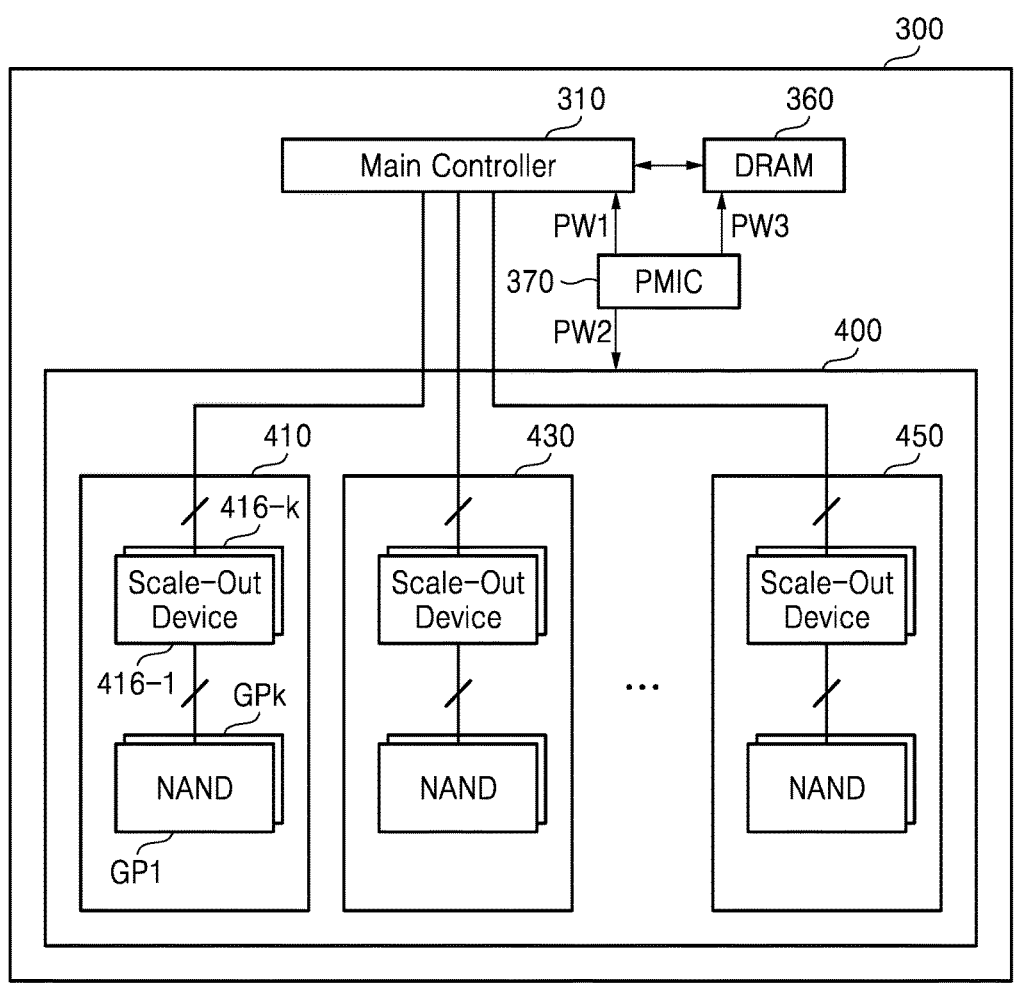
FIG. 2 is a detailed block diagram of a data storage device illustrated in FIG. 1.
Figure 3:
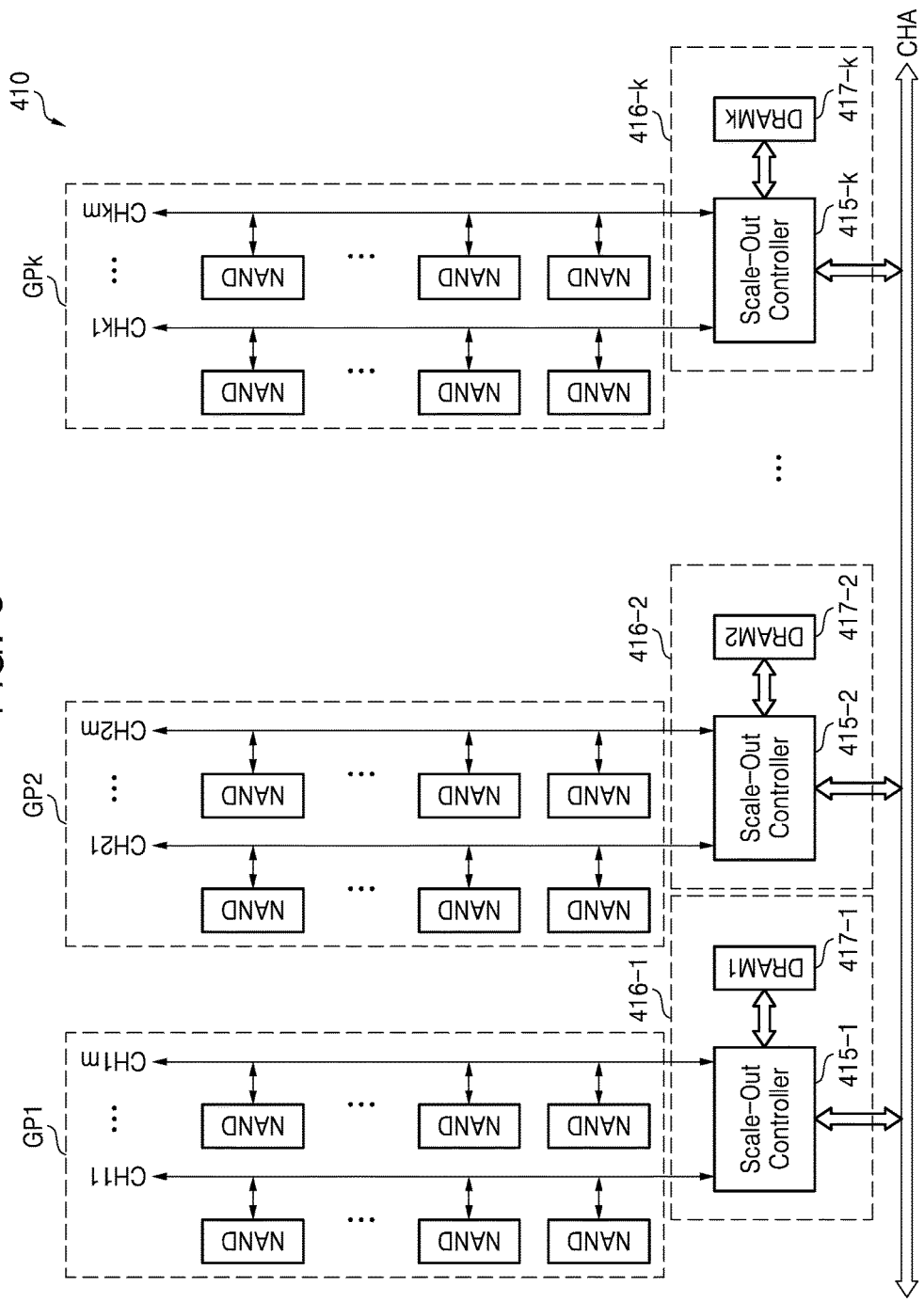
FIG. 3 is a block diagram of a first cluster illustrated in FIG. 2 according to some embodiments of the present disclosure.

FIG. 2 is a detailed block diagram of the data storage device 300 illustrated in FIG. 1; FIG. 3 is a block diagram of the first cluster 410 illustrated in FIG. 2 according to some embodiments of the present disclosure.

The data storage device 300 illustrated in FIG. 2 may have scale-out architecture, but the data storage devices described in the present disclosure are not restricted to the current embodiments. The first cluster 410 may include multiple scale-out storages or scale-out storage devices. A first scale-out storage may include a first scale-out device 416-1 and a first non-volatile memory device group GP1. A k-th scale-out storage may include a k-th scale-out device 416-k and a k-th non-volatile memory device group GPk. The structure of each of the other clusters 430 and 450 is substantially the same as or similar to that of the first cluster 410; detailed descriptions of the other clusters 430 and 450 will be omitted.

Since the structure and operations are substantially the same or similar among the clusters 410, 430, and 450, the structure and operation of the first cluster 410 illustrated in FIG. 3 will be representatively described.

The first cluster 410 may include scale-out devices 416-1 through 416-k (where "k" is a natural number of at least 3) and non-volatile memory device groups GP1 through GPk. The scale-out devices 416-1 through 416-k may include scale-out controllers 415-1 through 415-k, respectively, and volatile memory devices 417-1 through 417-k, respectively. Although multiple scale-out storages are illustrated in FIG. 3, the first cluster 410 may include one scale-out storage or more in other embodiments. Additionally, in embodiments where the main controller 310 is considered a first controller, scale-out controller(s) 415-1 may be considered a second controller or second controllers.

The first scale-out controller 415-1 may be connected to the first main channel CHA, channels CH11 through CH1m (where "m" is a natural number of at least 2), and the first volatile memory device 417-1. Multiple non-volatile memory devices NAND may be connected to each of the channels CH11 through CH1m. For example, the non-volatile memory devices NAND may be NAND-type flash memory devices or managed NAND flash memory devices but are not restricted thereto.

The first scale-out controller 415-1 may control the operation of the non-volatile memory devices NAND through the channels CH11 through CH1m. The main controller 310 may control the operation of the first scale-out controller 415-1.

The first volatile memory device 417-1 may include a first region to store logical address-to-physical address mapping information (or mapping table) regarding the non-volatile memory devices NAND connected to each of the channels CH11 through CH1m. The first volatile memory device 417-1 may also include a second region (or a cache region) to temporarily store data to be written to at least one of the non-volatile memory devices NAND connected to each of the channels CH11 through CH1m or data output from at least one of the non-volatile memory devices NAND connected to each of the channels CH11 through CH1m.

The second scale-out controller 415-2 may be connected to the first main channel CHA, channels CH21 through CH2m, and the second volatile memory device 417-2. Multiple non-volatile memory devices NAND may be connected to each of the channels CH21 through CH2m. The first scale-out controller 415-2 may control the operation of the non-volatile memory devices NAND through the channels CH21 through CH2m. The main controller 310 may control the operation of the second scale-out controller 415-2.

The second volatile memory device 417-2 may include a first region to store logical address-to-physical address mapping information (or mapping table) regarding the non-volatile memory devices NAND connected to each of the channels CH21 through CH2m. The second volatile memory device 417-2 may also include a second region (or a cache region) to temporarily store data to be written to at least one of the non-volatile memory devices NAND connected to each of the channels CH21 through CH2m or data output from at least one of the non-volatile memory devices NAND connected to each of the channels CH21 through CH2m.

The k-th scale-out controller 415-k may be connected to the first main channel CHA, channels CHk1 through CHkm, and the k-th volatile memory device 417-k. Multiple non-volatile memory devices NAND may be connected to each of the channels CHk1 through CHkm. The k-th scale-out controller 415-k may control the operation of the non-volatile memory devices NAND through the channels CHk1 through CHkm. The main controller 310 may control the operation of the k-th scale-out controller 415-k.

The k-th volatile memory 417-k may include a first region to store logical address-to-physical address mapping information (or mapping table) regarding the non-volatile memory devices NAND connected to each of the channels CHk1 through CHkm. The k-th volatile memory device 417-k may also include a second region (or a cache region) to temporarily store data to be written to at least one of the non-volatile memory devices NAND connected to each of the channels CHk1 through CHkm or data output from at least one of the non-volatile memory devices NAND connected to each of the channels CHk1 through CHkm.

Each of the volatile memory devices 417-1 through 417-k may be a buffer or a buffer memory and it may be implemented using RAM, SRAM, or DRAM. However, the volatile memory devices described herein are not restricted to the current embodiments. Although the non-volatile memory device groups GP1 through GPk include the same channels as one another in the embodiments illustrated in FIG. 3, the number of channels may be different among the non-volatile memory device groups GP1 through GPk.

Figure 4:
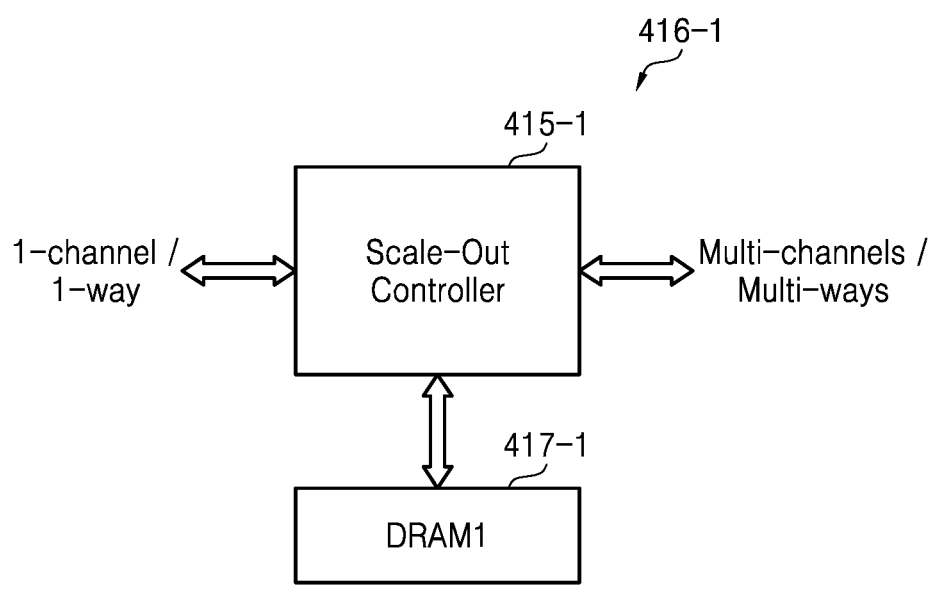
FIG. 4 is a schematic diagram of a first scale-out device illustrated in FIG. 3.
Figure 5:
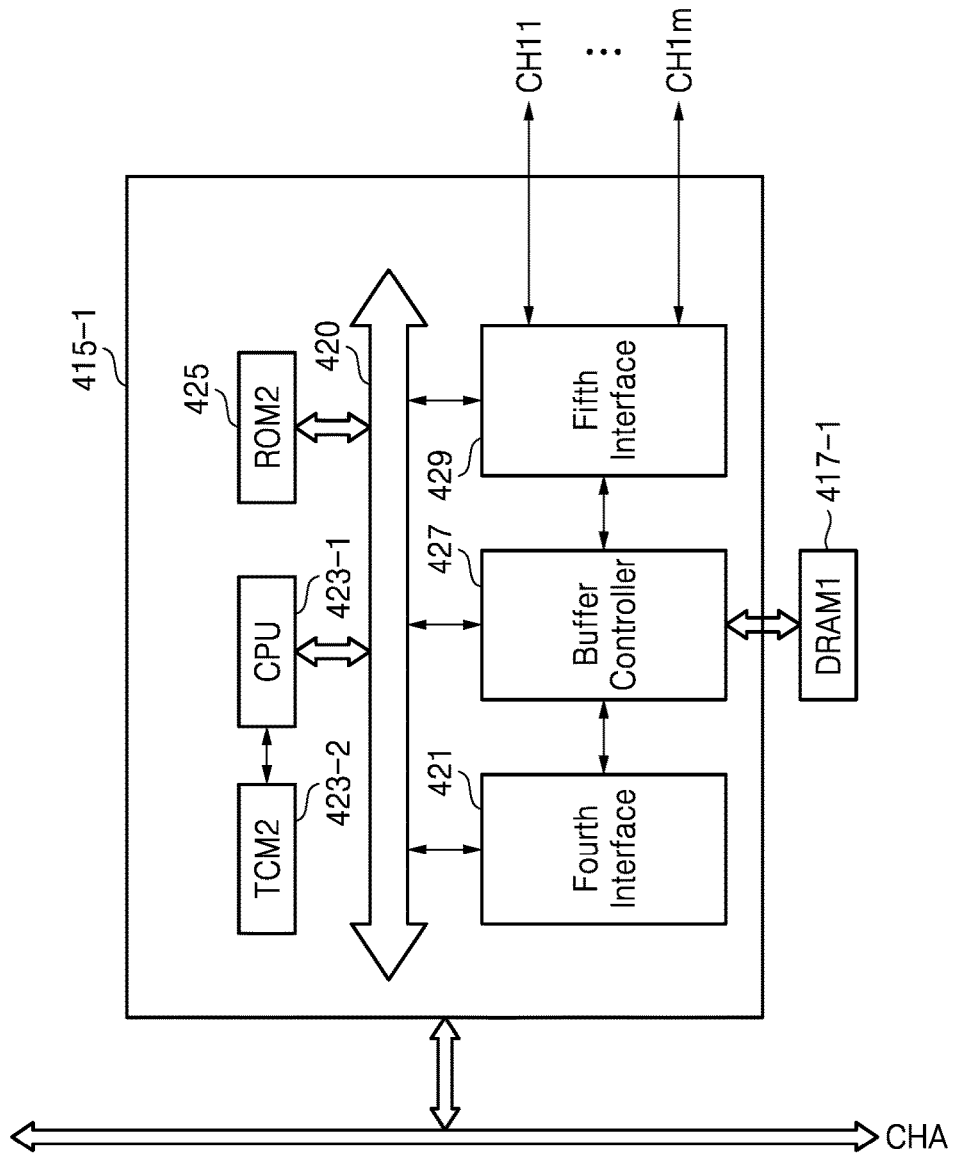
FIG. 5 is a block diagram of a first scale-out controller illustrated in FIG. 4.

FIG. 4 is a schematic diagram of the first scale-out device 416-1 illustrated in FIG. 3. FIG. 5 is a block diagram of the first scale-out controller 415-1 illustrated in FIG. 4. Referring to FIGS. 1 through 5, the structure and operations are substantially the same or similar among the scale-out controllers 415-1 through 415-k, and therefore, the structure and operations of the first scale-out controller 415-1 will be described representatively.

The first scale-out controller 415-1 may control transmission of data transferred among the main controller 310, the first volatile memory device 417-1, and the non-volatile memory devices NAND in the first non-volatile memory device group GP1. The first scale-out controller 415-1 may be implemented as an IC or a SoC.

The first scale-out controller 415-1 may include a transmission medium 420, a fourth interface 421, a CPU 423-1, a second internal memory device 423-2, a second ROM 425, a buffer controller 427, and a fifth interface 429. The transmission medium (e.g., transmission lines or a bus) 420 may be implemented as AMBA, AHB, APB, AXI, ASB, ACE, or a combination thereof, but the transmission mediums described herein are not restricted to these examples.

The fourth interface 421 may change the format of signals to be transmitted to the main controller 310 and may transmit the signals in a changed format to the main controller 310 through the first main channel CHA. The fourth interface 421 may also receive signals from the main controller 310, change the format of the signals, and transmit the signals in a changed format to the CPU 423-1 and/or the buffer controller 427. The fourth interface 421 may include a transceiver which transmits and receives signals.

The structure and operations of the fourth interface 421 may be configured to be compatible with those of the third interface 350. The fourth interface 421 may be SATA interface, SATAe interface, SAS, PCIe interface, NVMe interface, AHCI, MMC interface, NAND-type flash memory interface, or NOR-type flash memory interface, but it is not restricted thereto. The fourth interface 421 may be connected to a channel (or a main channel) or a way.

The CPU 423-1 may control the fourth interface 421, the second internal memory device 423-2, the second ROM 425, the buffer controller 427, and the fifth interface 429. The CPU 423-1 may include at least one core. When the CPU 423-1 includes a third CPU and a fourth CPU, the third CPU may communicate data with the third interface 350 via the fourth interface 421 and the fourth CPU may communicate data with at least one of the non-volatile memory devices NAND connected to each of the channels CH11 through CH1m via the fifth interface 429.

The second internal memory device 423-2 may store data necessary for the operations of the first scale-out controller 415-1 or data generated from a data processing operation (e.g. a write or read operation) performed by the first scale-out controller 415-1. The second internal memory device 423-2 may store a second FTL code or a second ROM code, which can be executed by the CPU 423-1. For example, when the data storage device 300 is booted, the second FTL code may be loaded from the memory cluster 400 to the second internal memory device 423-2 and the second ROM code may be loaded from the second ROM 425 to the second internal memory device 423-2. The second internal memory device 423-2 may be implemented as RAM, DRAM, SRAM, buffer, buffer memory, cache, or TCM, but the internal memory devices described in the present disclosure are not restricted to these examples. It is assumed that the second internal memory device 423-2 is a second TCM and the second TCM is implemented as SRAM.

The second ROM 425 may store the second ROM code. The second ROM 425 may be implemented as mask ROM or a serial NOR flash memory device.

The buffer controller 427 may write data to or read data from the first DRAM device 417-1 according to the control of the CPU 423-1 or the control of firmware (e.g., second firmware) executed in the CPU 423-1. The buffer controller 427 may be called a controller or a buffer manager that controls the write and read operations of the first DRAM device 417-1.

The fifth interface 429 may control a data processing operation of the non-volatile memory devices NAND through one of the channels CH11 through CH1$m$ according to the control of the CPU 423-1 or the control of firmware (e.g., second firmware) executed in the CPU 423-1.

Referring to FIGS. 4 and 5, multiple of the channels CH11 through CH1$m$ may be connected to the fifth interface 429. The fifth interface 429 may be SATA interface, SATAe interface, SAS, PCIe interface, NVMe interface, AHCI, MMC interface, NAND-type flash memory interface, or NOR-type flash memory interface, but it is not restricted thereto.

The first DRAM device 417-1 may include a first region which stores a mapping table for logical address-to-physical address translation with respect to the non-volatile memory devices NAND included in the first non-volatile memory device group GP1 and a second region which functions as a cache, but the DRAM devices described in the present disclosure are not restricted to the current embodiments. The second FTL code executed by the CPU 423-1 may perform logical address-to-physical address translation using the mapping table stored in the first region.

FIG. 6 is a diagram of the power sequence of the data storage device 300 illustrated in FIG. 1. FIGS. 1 through 6, the power-up sequence of the second operating voltage PW2 supplied to the memory cluster 400 occurs earlier than the power-up sequence of the operating voltage PW1 supplied to the main controller 310. Therefore, the data storage device 300 and a method of operating the same according to some embodiments of the present disclosure control the booting start time (or execution time) of the first firmware of the main controller 310 to be later than the booting start time (or execution time) of the second firmware of the memory cluster 400. That is, for example, PMIC 370 can control and coordinate operating voltages respectively supplied to the main controller 310, the DRAM device 360, and the memory cluster 400, so that the second firmware is booted by a (second) scale-out controller 415-1 particular to a scale-out device before the before first firmware is booted by a (first) main controller 310.

Figure 7:
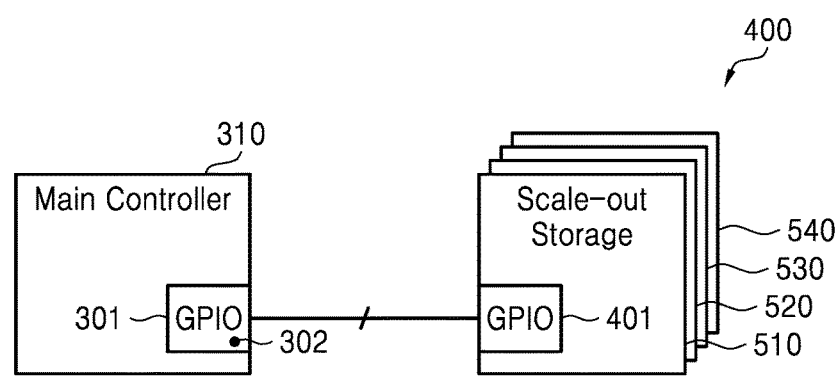
FIG. 7 is a diagram of general-purpose input/output (GPIO) connection in the data storage device illustrated in FIG. 1.

FIG. 7 is a diagram of general-purpose input/output (GPIO) connection in the data storage device 300 illustrated in FIG. 1. Referring to FIGS. 1 and 7, the main controller 310 includes first GPIO pins 301; each of scale-out storages 510, 520, 530, and 540 included in the memory cluster 400 includes second GPIO pins 401. The first GPIO pins 301 are connected with the second GPIO pins 401, respectively.

The data storage device 300 may perform normal boot mode or download mode depending on how one pin 302 among the first GPIO pins 301 is set. For instance, when a signal at a high level is input to the pin 302, the data storage device 300 may perform the download mode. When no signal is input to the pin 302, that is, when the pin 302 is open or floating, the data storage device 300 may perform the normal boot mode. A method of determining the normal boot mode or the download mode may be changed variously.

Each controller 310 or 415-1 may check the state of one pin 302 among the first GPIO pins 301 and determine the normal boot mode or the download mode for the operating mode of the data storage device 300.

Figure 8:
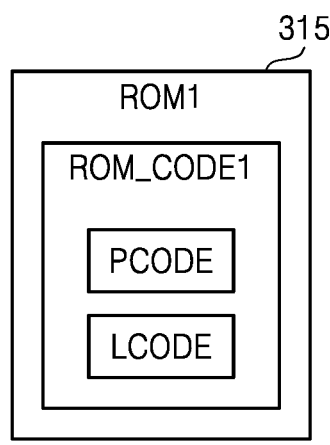
FIG. 8 is a diagram of a first read-only memory (ROM) code stored in a first ROM illustrated in FIG. 1 according to some embodiments of the present disclosure.

FIG. 8 is a diagram of a first ROM code ROM_CODE1 stored in the first ROM 315 illustrated in FIG. 1 according to some embodiments of the present disclosure. Referring to FIGS. 1 and 8, the first ROM 315 may store the first ROM code ROM_CODE1. The first ROM code ROM_CODE1 may include a first code PCODE for a physical command and a second code LCODE for a logical command. The first ROM code ROM_CODE1 may be copied or loaded to the first TCM 331 at the time of booting. Each of the codes PCODE and LCODE may be a microcode.

Figure 9:
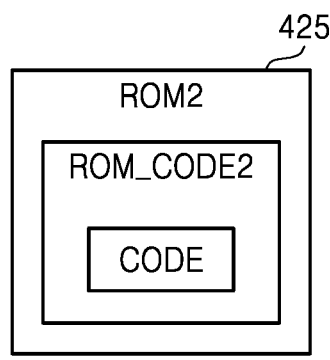
FIG. 9 is a diagram of a second ROM code stored in a second ROM illustrated in FIG. 5 according to some embodiments of the present disclosure.

FIG. 9 is a diagram of a second ROM code ROM_CODE2 stored in the second ROM 425 illustrated in FIG. 5 according to some embodiments of the present disclosure.

Referring to FIGS. 5 and 9, the second ROM 425 may store the second ROM code ROM_CODE2. The second ROM code ROM_CODE2 may include a code CODE. The code CODE may be a microcode for a physical command and/or a logical command.

Figure 10:
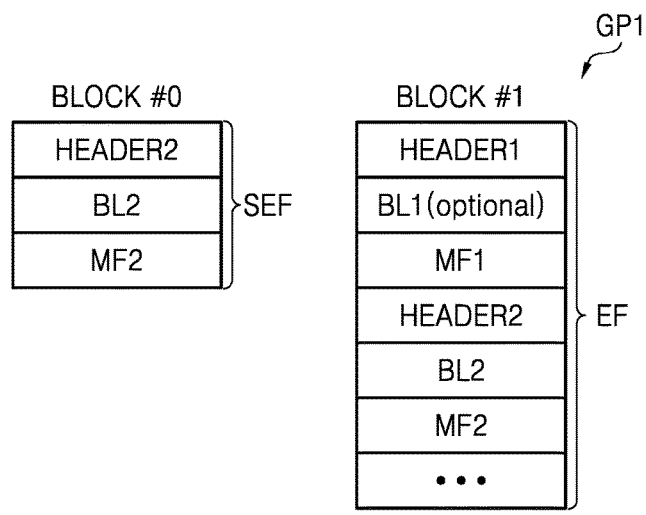
FIG. 10 is a diagram of data stored in a first block and a second block of a memory cluster illustrated in FIG. 1.

FIG. 10 is a diagram of data stored in a first block and a second block of a memory cluster illustrated in FIG. 1. Referring to FIG. 10, the first non-volatile memory device group GP1 may include a first block BLOCK#0 and a second block BLOCK#1. Each of the first and second blocks BLOCK#0 and BLOCK#1 may be defined by at least one of the non-volatile memory devices NAND included in the first non-volatile memory device group GP1. The first block BLOCK#0 and the second block BLOCK#1 may be included in one non-volatile memory device or in different non-volatile memory devices, respectively.

The first block BLOCK#0 may include or store a second full-firmware SEF executed in a first scale-out storage which includes the first scale-out device 416-1 and the first non-volatile memory device group GP1. The second full-firmware SEF may include a second header HEADER2, a second boot loader BL2, and second firmware MF2. The second header HEADER2 may include information about the second boot loader BL2 and the second firmware MF2.

The second block BLOCK#1 may include or store first full-firmware EF executed in the data storage device 300. The first full-firmware EF may include first header HEADER1, a first boot loader BL1, first firmware MF1, the second header HEADER2, the second boot loader BL2, and the second firmware MF2. The first full-firmware EF may not include the first boot loader BL1 in other embodiments. The first header HEADER1 may include information about the first boot loader BL1 and the first firmware MF1. The first firmware MF1 may be first main firmware and the second firmware MF2 may be second main firmware.

Figure 11:
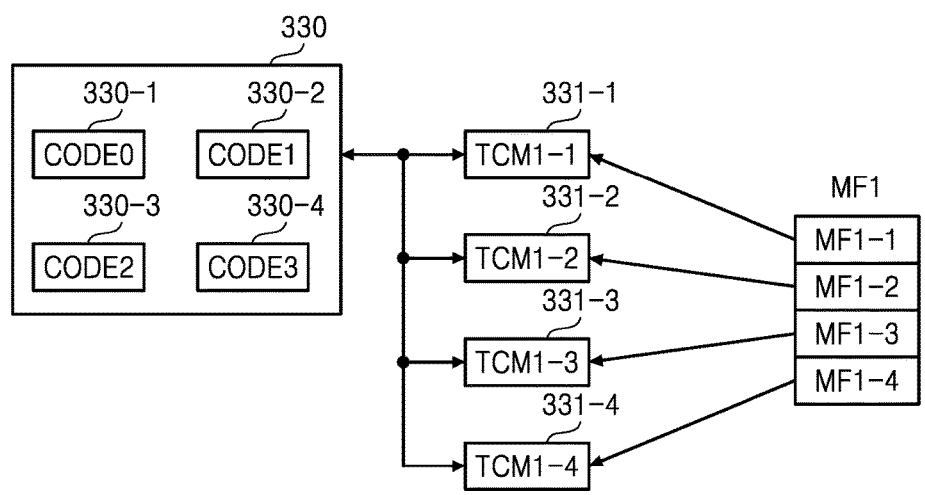
FIG. 11 is a conceptual diagram of the shadowing of first main firmware.

FIG. 11 is a conceptual diagram of the shadowing of the first main firmware MF1. Referring to FIGS. 1 and 11, the shadowing may refer to copying or loading. When the CPU 330 includes four cores 330-1 through 330-4, four TCMs 331-1 through 331-4 are required. In other words, as many TCMs as cores included in the CPU 330 or 423-1 are required.

For example, the first firmware MF1 stored in the DRAM device 360 may be divided into four portions MF1-1 through MF1-4, which may be shadowed, copied, or loaded from the DRAM device 360 to the four TCMs 331-1 through 331-4, respectively. The four portions MF1-1 through MF1-4 that have been respectively shadowed to the four TCMs 331-1 through 331-4 may be respectively executed by the four cores 330-1 through 330-4 simultaneously or in parallel.

Figure 12:
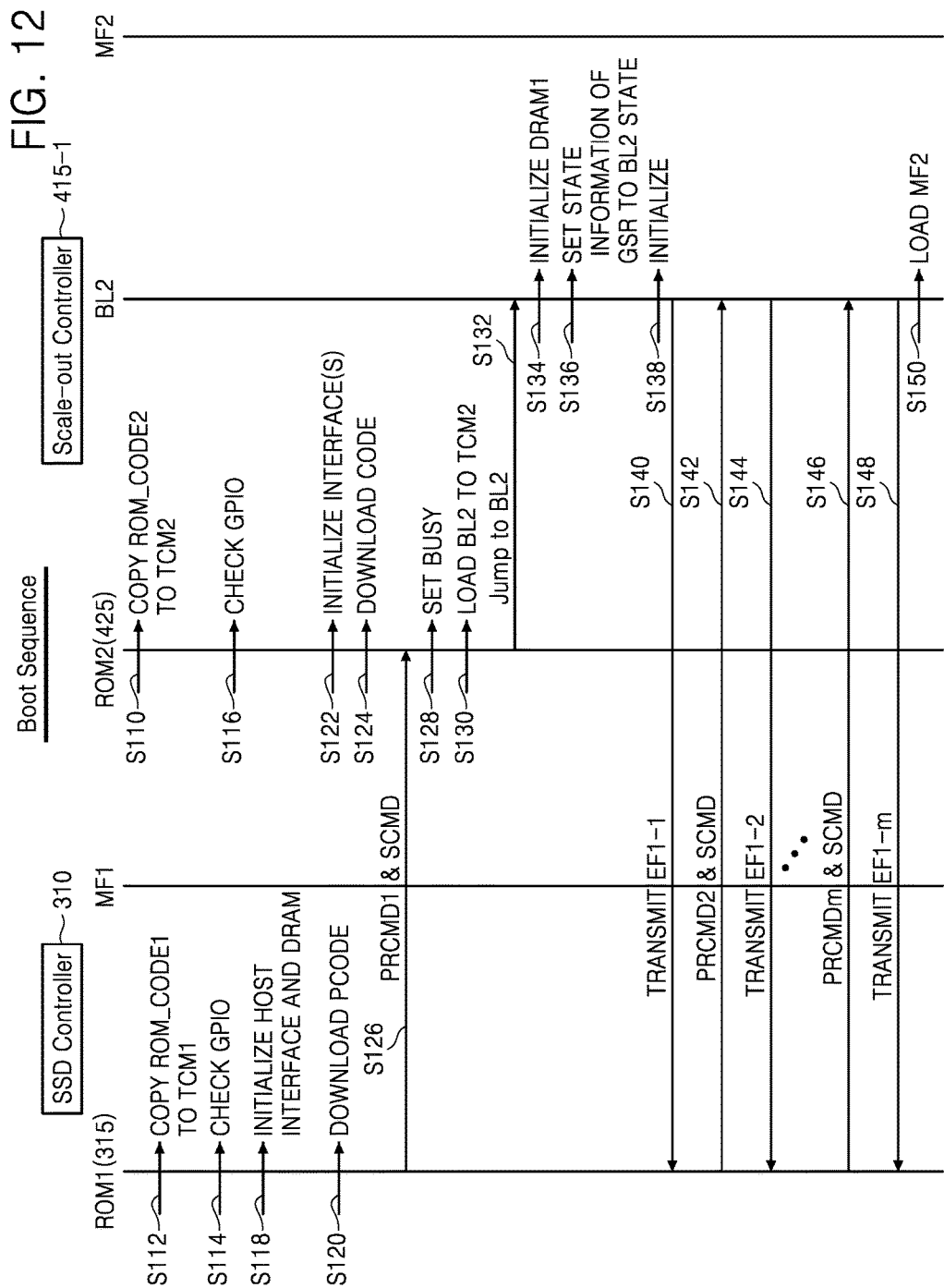

FIGS. 12 and 13 are conceptual diagrams for explaining a boot sequence of the data processing system 100 illustrated in FIG. 1. Referring to FIGS. 1 through 13, the second operating voltage (or second power) PW2 supplied to the first scale-out storage included in the first cluster 410 is coordinated and controlled to be powered up earlier than the first operating voltage (or first power) PW1 supplied to the first main controller (hereinafter, referred to as an "SSD controller") 310.

When the second operating voltage PW2 is fully supplied to the first scale-out storage, the second ROM code ROM_CODE2 stored in the second ROM 425 of the first scale-out controller 415-1 of the first scale-out storage is copied to the second TCM 423-2 that can be accessed by the CPU 423-1 in operation S110. Thereafter, when the first operating voltage PW1 is fully supplied to the SSD controller 310, the first ROM code ROM_CODE1 stored in the first ROM 315 of the SSD controller 310 is copied to the first TCM 331 that can be accessed by the CPU 330 in operation S112.

The first ROM code ROM_CODE1 copied to the first TCM 331 checks the state of the first GPIO pins 301 of the SSD controller 310 in operation S114 and the second ROM code ROM_CODE2 copied to the second TCM 423-2 checks the state of the second GPIO pins 401 of the first scale-out storage in operation S116. It is assumed that the first scale-out storage is the first scale-out storage 510 illustrated in FIG. 7. When it is assumed that the pin 302 among the first GPIO pins 301 is open, the data storage device 300 operates in the normal boot mode.

As shown in FIG. 8, the first ROM code ROM_CODE1 stored in the first ROM 315 of the SSD controller 310 may include the first code PCODE for a physical command and a second code LCODE for a logical command. As shown in FIG. 9, the second ROM code ROM_CODE2 stored in the second ROM 425 of the first scale-out controller 415-1 may include the code CODE.

The first ROM code ROM_CODE1 executed in the SSD controller 310 initializes the second interface 320, i.e., the host interface and the DRAM device 360 in operation S118. The first code PCODE of the first ROM code ROM_CODE1 executed in the SSD controller 310 is downloaded to the third interface 350 in order to configure the elements of the third interface 350 in operation S120. The third interface 350 configures the elements (or components) using the first code PCODE to process a physical command. The elements of the third interface 350 may be configured to process physical commands.

The second ROM code ROM_CODE2 executed in the first scale-out controller 415-1 initializes at least one interface 421 and/or 429 in operation S122. The code CODE included in the second ROM code ROM_CODE2 is downloaded to the at least one interface 421 and/or 429 in operation S124 so that the at least one interface 421 and/or 429 can process a physical command. The at least one interface 421 and/or 429 configures its own elements using the code CODE to process the physical command.

The first ROM code ROM_CODE1 transmits a first physical read command PRCMD1, which is for downloading the first full-firmware EF needed by the SSD controller 310 from the non-volatile memory devices NAND included in the first non-volatile memory device group GP1 to the DRAM device 360, and a state command SCMD, which is for checking "ready" and "busy", to the first scale-out controller 415-1 in operation S126. The second ROM code ROM_CODE2 sets the operating state of the first scale-out controller 415-1 to "busy" in response to the first physical read command PRCMD1 in operation S128.

The second ROM code ROM_CODE2 reads the second boot loader BL2 stored in the first block BLOCK#0 defined by the non-volatile memory devices NAND included in the first non-volatile memory device group GP1 in response to the first physical read command PRCMD1 and copies or loads the second boot loader BL2 to the second TCM 423-2 in operation S130. After the second boot loader BL2 is copied to the second TCM 423-2, the second ROM code ROM_CODE2 jumps to the second boot loader BL2 in operation S132, so that the second boot loader BL2 is executed.

The second boot loader BL2 initializes the first DRAM device 417-1 in operation S134 and sets in a state field of a global state register GSR that a current state is a state where the second boot loader BL2 is executed in operation S136. In other words, the state information of the state field of the global state register GSR is set to a second boot loader state in which the second boot loader BL2 is executed in operation S136. The second boot loader BL2 initializes the first scale-out storage in operation S138.

The first full-firmware EF including the first header HEADER1, the first boot loader BL1 (which may not exist in other embodiments), the first firmware MF1, the second header HEADER2, the second boot loader BL2, and the second firmware MF2, which are stored in the second block BLOCK#1 defined by the non-volatile memory devices NAND included in the first non-volatile memory device group GP1, is transmitted by predetermined size (e.g., 16 Kbytes) to the SSD controller 310, until it is completely transmitted.

For example, the first full-firmware EF is transmitted by predetermined size (e.g., 16 Kbytes) to the SSD controller 310 according to the control of the second boot loader BL2 after being copied to the first DRAM device 417-1. For instance, when the second boot loader BL2 transmits a first portion EF-1 of the first full-firmware EF stored in the first DRAM device 417-1 to the SSD controller 310 in response to the first physical read command PRCMD1 in operation S140, the first ROM code ROM_CODE1 stores the first portion EF-1 in the DRAM device 360.

The first ROM code ROM_CODE1 transmits a second physical read command PRCMD2 and the state command SCMD to the first scale-out controller 415-1 in operation S142. When the second boot loader BL2 transmits a second portion EF-2 of the first full-firmware EF stored in the first DRAM device 417-1 to the SSD controller 310 in response to the second physical read command PRCMD2 in operation S140, the first ROM code ROM_CODE1 stores the second portion EF-2 in the DRAM device 360.

When the first full-firmware EF is divided into "m" units, the first ROM code ROM_CODE1 transmits an m-th physical read command PRCMDm and the state command SCMD to the first scale-out controller 415-1 in operation S146. When the second boot loader BL2 transmits an m-th portion EF-m of the first full-firmware EF stored in the first DRAM device 417-1 to the SSD controller 310 in response to the m-th physical read command PRCMDm in operation S148, the first ROM code ROM_CODE1 stores the m-th portion EF-m in the DRAM device 360. The first full-firmware EF is loaded to the DRAM device 360 through operations S126 through S148 described above.

While the first full-firmware EF is being transmitted by predetermined size (e.g., 16 Kbytes) from the first DRAM device 417-1 of the first scale-out storage to the DRAM device 360, the second firmware MF2 stored in the first block BLOCK#0 defined by the non-volatile memory devices NAND included in the first non-volatile memory device group GP1 is loaded to the second TCM 423-2 through the first DRAM device 417-1 in operation S150.

In other embodiments, after the first full-firmware EF is loaded to the DRAM device 360 through operations S126 through S148, the second firmware MF2 stored in the first block BLOCK#0 may be loaded to the second TCM 423-2 through the first DRAM device 417-1 in operation S150.

When the first full-firmware EF downloaded to the DRAM device 360 includes the first boot loader BL1, the first boot loader BL1 is copied from the DRAM device 360 to the first TCM 331 in operation S152. However, when the first full-firmware EF downloaded to the DRAM device 360 does not include the first boot loader BL1, operation S152 is not performed.

When the first full-firmware EF downloaded to the DRAM device 360 includes the first boot loader BL1, the first boot loader BL1 performs operations S154, S156, S158, and S166. When the first full-firmware EF downloaded to the DRAM device 360 does not include the first boot loader BL1, the first ROM code ROM_CODE1 loaded to the first TCM 331 of the SSD controller 310 performs operations S154, S156, S158, and S166.

The first boot loader BL1 or the first ROM code ROM_CODE1 changes a mode from a physical mode to a logical mode in operation S154. The physical mode operates based on a physical address; the logical mode operates based on a logical address. Accordingly, a physical command is a command (e.g., a write command or a read command) that includes a physical address; a logical command is a command (e.g., a write command or a read command) that includes a logical address.

The first boot loader BL1 or the first ROM code ROM_CODE1 downloads the second code LCODE to the third interface 350 in operation S156. The third interface 350 is set to process the logical command using the second code LCODE in operation S156.

The first boot loader BL1 or the first ROM code ROM_CODE1 transmits a boot command, i.e., an execution command to execute the second firmware MF2 to the first scale-out controller 415-1 in operation S158. The second boot loader BL2 jumps to the second firmware MF2 in response to the execution command to execute the second firmware MF2 in operation S160. Accordingly, the second firmware MF2 is booted or executed.

The second firmware MF2 may set in a state field of the global state register GSR that the current state is a state where the second firmware MF2 is executed in operation S162. In other words, the state information of the state field of the global state register GSR is set to a second firmware state in which the second firmware MF2 is executed in operation S162.

The first boot loader BL1 or the first ROM code ROM_CODE1 reads the global state register GSR in operation S164 in order to check whether the state of the first scale-out controller 415-1 has been changed from the second boot loader state to the second firmware state. The second firmware MF2 may transmit the global state register GSR to the SSD controller 310 in response to a command transmitted from the first boot loader BL1 or the first ROM code ROM_CODE1 in operation S164. The first boot loader BL1 or the first ROM code ROM_CODE1 checks information included in the state field of the global state register GSR and copies the first firmware MF1 from the DRAM device 360 to the first TCM 331 in operation S166.

After the first firmware MF1 is copied to the first TCM 331, the first boot loader BL1 or the first ROM code ROM_CODE1 jumps to the first firmware MF1 in operation S168. For example, when the CPU 330 includes multiple of the cores 330-1 through 330-4 and the TCMs 331-1 through 331-4 respectively corresponding to the cores 330-1 through 330-4 exist in the SSD controller 310, as shown in FIG. 11; the portions MF1-1 through MF1-4 of the first firmware MF1 are loaded to the TCMs 331-1 through 331-4, respectively, in operation S166.

As a result, the cores 330-1 through 330-4 are simultaneously activated by the portions MF1-1 through MF1-4 respectively loaded to the TCMs 331-1 through 331-4, that is, the first firmware MF1 is executed by the CPU 330 in operation S170. For instance, the first core 330-1 may execute the first portion MF1-1 loaded to the TCM 331-1; the second core 330-2 may execute the second portion MF1-2 loaded to the TCM 331-2; the third core 330-3 may execute the third portion MF1-3 loaded to the TCM 331-3; the fourth core 330-4 may execute the fourth portion MF1-4 loaded to the TCM 331-4. The portions MF1-1 through MF1-4 may have the same size as or different sizes from one another.

The first portion MF1-1 of the first firmware MF1, which is executed by one core (e.g., 330-1) among the cores 330-1 through 330-4, may check the version of the first firmware MF1 and/or the version of the second firmware MF2 in operation S172. The first portion MF1-1 of the first firmware MF1 transmits the global state register GSR, which has been received from the first scale-out controller 415-1, to the first scale-out controller 415-1 in operation S174. The second firmware MF2 executed in the first scale-out controller 415-1 writes its own version information to the state field of the global state register GSR in operation S176. The second firmware MF2 transmits a global state register GSR' including the version information to the SSD controller 310 in operation S178. In other words, the first portion MF1-1 of the first firmware MF1 receives the global state register GSR' that has been revised by the second firmware MF2 in operation S178. The global state register GSR or GSR' may refer to data.

The SSD controller 310 is booted later than the first scale-out storage. Although the boot sequence of a data storage device including the SSD controller 310 and a single scale-out storage has been described with reference to FIGS. 1 through 13, the teachings of the present disclosure may also be applied to the boot sequence of the data storage device 300 including the SSD controller 310 and multiple scale-out storages. In other words, after all of the scale-out storages are booted, the SSD controller 310 may be booted.

The data storage device 300 includes the first volatile memory device 360, a first scale-out storage, and the first controller 310. The first controller 310 controls the first volatile memory device 360 and the first scale-out storage and executes the first firmware MF1. The first scale-out storage may include the second volatile memory device 417-1, the first non-volatile memory device GP1, and the second controller 415-1. The second controller 415-1 controls the second volatile memory device 417-1 and the first non-volatile memory device GP1 and executes the second firmware MF2. The first non-volatile memory device GP1 may be defined as a collective concept that includes at least one non-volatile memory devices NAND. The first controller 310 performs booting (or execution) of the first firmware MF1 after the booting (or execution) of the second firmware MF2 is completed by the second controller 415-1.

The data storage device 300 also include the PMIC 370 which supplies the second operating voltage PW2 to the first scale-out storage at the second supply point T2 and supplies the first operating voltage PW1 to the first controller 310 at the first supply point T1, as shown in FIG. 6. The second supply point T2 comes earlier than the first supply point T1.

As shown in FIG. 10, the first non-volatile memory device GP1 includes the first block BLOCK#0 which stores the second full-firmware SEF including the second boot loader BL2 and the second firmware MF2, and the second block BLOCK#1 which stores the first full-firmware EF including the first firmware MF1, the second boot loader BL2, and the second firmware MF2.

The second controller 415-1 loads the second boot loader BL2 from the first block BLOCK#0 to the second controller 415-1 in response to the first physical read command PRCMD1 output from the first controller 310 in operation S130; transmits the first full-firmware EF from the second block BLOCK#1 to the first controller 310 using the second boot loader BL2 in operations S140, S144, and S148; and loads the second firmware MF2 from the first block BLOCK#0 to the second controller 415-1 using the second boot loader BL2 in operation S150. Commands involved in the transmission of the first full-firmware EF are second physical read commands PRCMD1 through PRCMDm including the first physical read command PRCMD1.

The second controller 415-1 downloads the second boot loader BL2 from the first block BLOCK#0 to the second controller 415-1 without using or via the second volatile memory device 417-1 in operation S130; initializes the second volatile memory device 417-1 using the second boot loader BL2 in operation S134; transmits the first full-firmware EF to the first controller 310 via the second volatile memory device 417-1 in operation S140, S144, and S148; and downloads the second firmware MF2 to the second controller 415-1 via the second volatile memory device 417-1 in operation S150.

The first controller 310 stores the first full-firmware EF transmitted from the second controller 415-1 in the first volatile memory device 360, changes its own operating mode from the physical mode operating based on a physical address to the logical mode operating based on a logical address in operation S154, and transmits the execution command to execute the second firmware MF2 to the second controller 415-1 in operation S158.

The second controller 415-1 executes the second firmware MF2 in response to the execution command in operation S160, transmits an indicator signal indicating the execution of the second firmware MF2 to the first controller 310 in operation S164, and the first controller 310 loads the first firmware MF1 included in the first full-firmware EF stored in the first volatile memory device 360 to the first controller 310 in response to the indicator signal in operation S166.

The first controller 310 executes the first firmware MF1 in operation S170 and transmits a version check command to the second controller 415-1 in operation S174. The second controller 415-1 transmits the version information of the second firmware MF2 to the first controller 310 in response to the version check command in operation S178.

FIGS. 14 and 15 are conceptual diagrams for explaining a firmware download sequence of the data processing system 100 illustrated in FIG. 1. Referring to FIGS. 1 to 11, 14, and 15, the second operating voltage (or the second power) PW2 is supplied to the first scale-out storage included in the first cluster 410 before the first operating voltage (or the first power) PW1 is supplied to the SSD controller 310, as shown in FIG. 6.

When the second operating voltage PW2 is fully supplied to the first scale-out storage, the second ROM code ROM_CODE2 stored in the second ROM 425 of the first scale-out controller 415-1 of the first scale-out storage is copied to the second TCM 423-2 that can be accessed by the CPU 423-1 in operation S210. Thereafter, when the first operating voltage PW1 is fully supplied to the SSD controller 310, the first ROM code ROM_CODE1 stored in the first ROM 315 of the SSD controller 310 is copied to the first TCM 331 that can be accessed by the CPU 330 in operation S212.

The first ROM code ROM_CODE1 copied to the first TCM 331 checks the first GPIO pins 301 of the SSD controller 310 in operation S214 and the second ROM code ROM_CODE2 copied to the second TCM 423-2 checks the second GPIO pins 401 of the first scale-out storage in operation S216. It is assumed that the first scale-out storage is the first scale-out storage 510 illustrated in FIG. 7. When it is assumed that a signal at a high level is applied to one pin 302 among the first GPIO pins 301, the data storage device 300 operates in the download mode.

The first ROM code ROM_CODE1 executed in the SSD controller 310 initializes the second interface 320, i.e., the host interface and the DRAM device 360 in operation S218. The first code PCODE of the first ROM code ROM_CODE1 is downloaded to the third interface 350 in operation S220. The third interface 350 is configured using the first code PCODE to process physical commands.

The host 200 may transmit the first full-firmware EF, which has been described with reference to FIG. 10, to the SSD controller 310 through the interface 110 in operation S222. The first ROM code ROM_CODE1 may store the first full-firmware EF in the DRAM device 360 in operation S224.

When the first full-firmware EF downloaded to the DRAM device 360 includes the first boot loader BL1, the first ROM code ROM_CODE1 may copy (or load) or shadow the first boot loader BL1 from the DRAM device 360 to the first TCM 331 in operation S226. When the first full-firmware EF downloaded to the DRAM device 360 includes the first boot loader BL1, the first boot loader BL1 may perform operations S228, S230, S232, S246, S250, S254, and S266. However, when the first full-firmware EF downloaded to the DRAM device 360 does not include the first boot loader BL1, the first ROM code ROM_CODE1 may perform operations S228, S230, S232, S246, S250, S254, and S266.

The first boot loader BL1 or the first ROM code ROM_CODE1 changes the operating mode of the SSD controller 310 from the physical mode to the logical mode in operation S228. The second code LCODE of the first ROM code ROM_CODE1 is downloaded to the third interface 350 in operation S230. The third interface 350 is configured using the second code LCODE to process logical commands.

As described above, the physical mode allows a physical command to be executed or processed; the logical mode allows a logical command to be executed or processed. The physical command is based on a physical address and the logical command is based on a logical address.

The first boot loader BL1 or the first ROM code ROM_CODE1 transmits the logical command to the first scale-out storage. For instance, the first boot loader BL1 or the first ROM code ROM_CODE1 transmits the second header HEADER2 and the second boot loader BL2 to the first scale-out controller 415-1 in operation S232.

The second ROM code ROM_CODE2 executed in the first scale-out controller 415-1 directly or immediately stores the second boot loader BL2 in the second TCM 423-2 in operation S234. In other words, since the first DRAM device 417-1 has not been initialized, the second ROM code ROM_CODE2 directly or immediately stores the second boot loader BL2 in the second TCM 423-2 without using or via the first DRAM device 417-1. The second ROM code ROM_CODE2 jumps to the second boot loader BL2 in operation S236. As a result, the second boot loader BL2 is executed in operation S238.

The second boot loader BL2 initializes the first DRAM device 417-1 and sets in the state field of the global state register GSR that the current state is a state in which the second boot loader BL2 is executed. In other words, the state information of the state field of the global state register GSR is set to the second boot loader state, in which the second boot loader BL2 is executed, in operation S242. The second boot loader BL2 initializes elements to be initialized in the first scale-out storage in operation S244.

The first boot loader BL1 or the first ROM code ROM_CODE1 transmits the second full-firmware SEF and a logical command involved in the storing of the second full-firmware SEF to the first scale-out storage in operation S246. The second full-firmware SEF includes the second header HEADER2, the second boot loader BL2, and the second firmware MF2, as shown in FIG. 10. The second boot loader BL2 stores the second full-firmware SEF in the first DRAM device 417-1 and writes (or programs) the second full-firmware SEF stored in the first DRAM device 417-1 to the first block BLOCK#0 defined by the non-volatile memory devices NAND included in the first non-volatile memory device group GP1 in operation S248.

The first boot loader BL1 or the first ROM code ROM_CODE1 transmits the first full-firmware EF and a logical command involved in the storing of the first full-firmware EF to the first scale-out storage in operation S250. The first full-firmware EF includes the first header HEADER1, the first boot loader BL1 (which may not exist in other embodiments), the first firmware MF1, the second header HEADER2, the second boot loader BL2, and the second firmware MF2, as shown in FIG. 10. The second boot loader BL2 stores the first full-firmware EF in the first DRAM device 417-1 and writes (or programs) the first full-firmware EF stored in the first DRAM device 417-1 to the second block BLOCK#1 defined by the non-volatile memory devices NAND included in the first non-volatile memory device group GP1 in operation S252.

The first boot loader BL1 or the first ROM code ROM_CODE1 transmits a command to execute the second firmware MF2 to the first scale-out controller 415-1 in operation S254. The second boot loader BL2 copies the second firmware MF2 from the first DRAM device 417-1 to the second TCM 423-2 in response to the command to execute the second firmware MF2 in operation S256. The term "copy" may have the same meaning as the term "shadow".

When the second firmware MF2 is copied to the second TCM 423-2, the second boot loader BL2 jumps to the second firmware MF2 in operation S258. As a result, the second firmware MF2 is executed in operation S260. The second firmware MF2 sets in the state field of the global state register GSR that the current state is a state in which the second firmware MF2 is executed. In other words, the state information of the state field of the global state register GSR is set to the second firmware state, in which the second firmware MF2 is executed, in operation S262.

The first boot loader BL1 or the first ROM code ROM_CODE1 reads the global state register GSR from the first scale-out controller 415-1 in operation S264. The global state register GSR may include a state information region in which the state information is stored and a version information region in which version information is stored.

After reading the global state register GSR, the first boot loader BL1 or the first ROM code ROM_CODE1 copies the first firmware MF1 from the DRAM device 360 to the first TCM 331, which can be accessed by the CPU 330, in operation S266. When the CPU 330 includes multiple of the cores 330-1 through 330-4 and the TCMs 331-1 through 331-4 respectively corresponding to the cores 330-1 through 330-4 exist in the SSD controller 310, as shown in FIG. 11; the portions MF1-1 through MF1-4 of the first firmware MF1 are loaded to the TCMs 331-1 through 331-4, respectively, in operation S266.

After the first firmware MF1 is copied from the DRAM device 360 to the first TCM 331, the first boot loader BL1 or the first ROM code ROM_CODE1 jumps to the first firmware MF1 in operation S268. Accordingly, the cores 330-1 through 330-4 are simultaneously activated by the portions MF1-1 through MF1-4 respectively loaded to the TCMs 331-1 through 331-4. In other words, the first firmware MF1 is executed by the CPU 330 in operation S270.

The first firmware MF1 of the SSD controller 310 is executed later than the second firmware MF2 of the first scale-out storage. The first firmware MF1 of the SSD controller 310 may be written to the non-volatile memory devices NAND later than the second firmware MF2 of the first scale-out storage.

Although the download sequence of a data storage device including the SSD controller 310 and a single scale-out storage has been described with reference to FIGS. 14 and 15, the teachings of the present disclosure may also be applied to the download sequence of a data storage device including the SSD controller 310 and multiple scale-out storages. In other words, only after firmware for each of the scale-out storages is executed in each scale-out storage, firmware for the SSD controller 310 may be executed.

The first controller 310 receives the first full-firmware EF including the first firmware MF1, the second boot loader BL2, and the second firmware MF2 from an external device connected to the first controller 310 in operation S222 and stores the first full-firmware EF in the first volatile memory device 360 in operation S224.

The first controller 310 changes the operating mode of the first controller 310 from the physical mode operating based on a physical address to the logical mode operating based on a logical address in operation S228 and transmits the second header HEADER2 and the second boot loader BL2 to the second controller 415-1 using a first logical command in operation S232. The second controller 415-1 initializes the second volatile memory device 417-1 using the second boot loader BL2 in operation S240.

The first controller 310 transmits the second full-firmware SEF including the second boot loader BL2 and the second firmware MF2 to the second controller 415-1 using a second logical command in operation S246. The second controller 415-1 writes the second full-firmware SEF to the first block BLOCK#0 of the first non-volatile memory device GP1 via the second volatile memory device 417-1 in operation S248.

The first controller 310 transmits the first full-firmware EF to the second controller 415-1 using a third logical command in operation S250. The second controller 415-1 writes the first full-firmware EF to the second block BLOCK#1 of the first non-volatile memory device GP1 via the second volatile memory device 417-1 in operation S252.

The first controller 310 transmits an execution command indicating the execution of the second firmware MF2 to the second controller 415-1 in operation S254. The second controller 415-1 downloads and executes the second firmware MF2 included in the second full-firmware SEF stored in the second volatile memory device 417-1 in response to the execution command in operations S256 through S260 and transmits an indicator signal indicating that the second firmware MF2 is executed to the first controller 310 in operation S264. The first controller 310 downloads the first firmware MF1 included in the first full-firmware EF from the first volatile memory device 360 to the first controller 310 in response to the indicator signal in operation S266 and executes the first firmware MF1 in operation S270.

The external device is either the host 200 or a second scale-out storage. The second scale-out storage includes the third volatile memory device 417-2, the second non-volatile memory device GP2 that stores the first full-firmware EF, and the third controller 415-2 that controls the third volatile memory device 417-2 and the second non-volatile memory device GP2. In other words, when the external device is the host 200, the host 200 transmits the first full-firmware EF to the first controller 310 in operation S222.

Figure 16A:
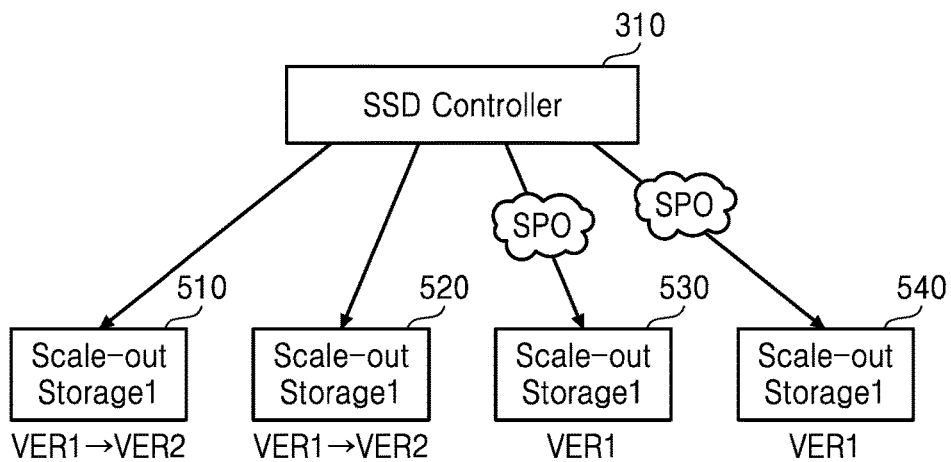
FIGS. 16A through 16C are conceptual diagrams for explaining a method of eliminating firmware discrepancy among multiple scale-out storages.
Figure 16B:
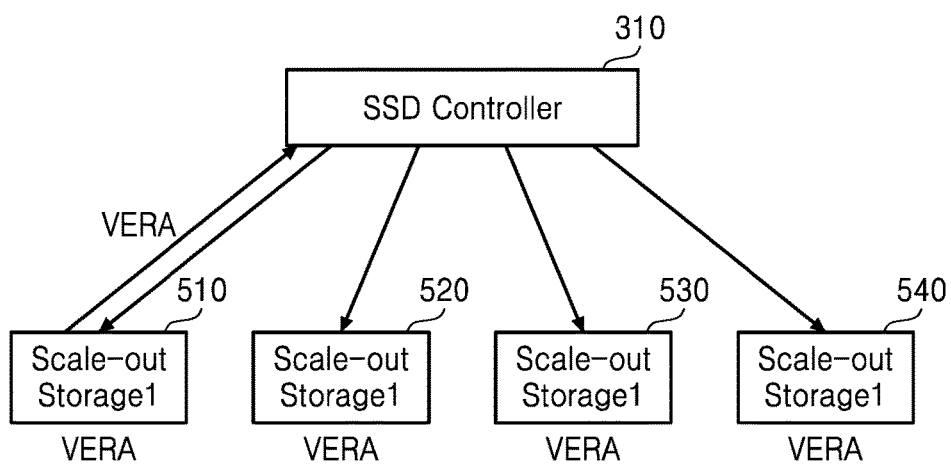
Figure 16C:
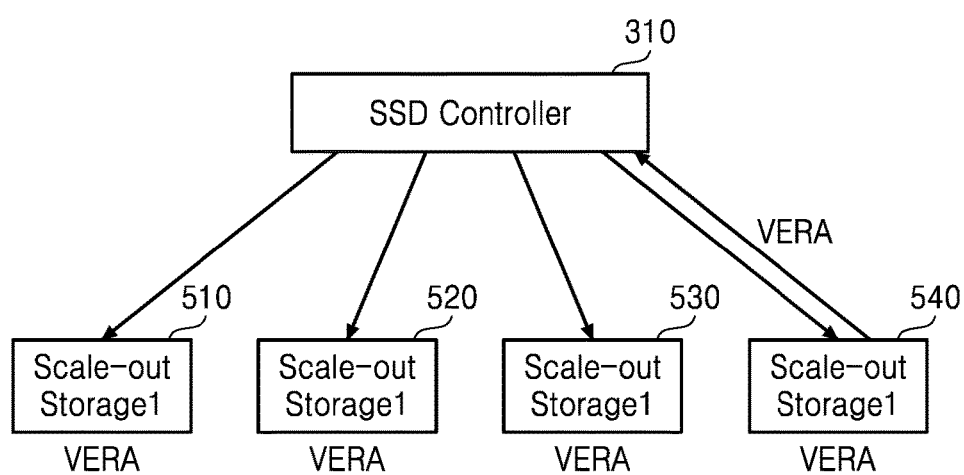

FIGS. 16A through 16C are conceptual diagrams for explaining a method of eliminating firmware discrepancy among multiple scale-out storages. The method of eliminating firmware discrepancy among multiple scale-out storages will be described with reference to FIGS. 1 through 16C.

Each of the scale-out storages 510 through 540 may include a scale-out device and multiple non-volatile memory devices. The structure of the scale-out device is the same as that of the scale-out device 416-1 described with reference to FIGS. 3 through 5; the non-volatile memory devices are the same as the non-volatile memory devices NAND included in the first non-volatile memory device group GP1.

A sudden power off (SPO) may occur in the data storage device 300 while firmware for each of the scale-out storages 510 through 540 is being updated or downloaded through the SSD controller 310. For example, while firmware for each of the two scale-out storages 510 and 520 among the four scale-out storages 510 through 540 is changed from a first version VER1 to a second version VER2, firmware for each of the other two scale-out storages 530 and 540 remains in the first version VER1, as shown in FIG. 16A. In other words, the firmware versions of the scale-out storages 510 through 540 do not agree with one another.

When the firmware versions of the scale-out storages 510 through 540 are different from one another, the data storage device 300 according to some embodiments of the present disclosure may allow the scale-out storages 510 through 540 to have the same version of firmware using the firmware for one of the scale-out storages 510 through 540.

In detail, as described above with reference to FIGS. 12 through 15, the first ROM code ROM_CODE1 executed in the SSD controller 310 may receive or read firmware for the SSD controller 310 and firmware for one of the scale-out storages 510 through 540 from the one scale-out storage 510, 520, 530, or 540 after the data storage device 300 is recovered to a normal state. For instance, the first ROM code ROM_CODE1 executed in the SSD controller 310 may receive or read first full-firmware stored in the second block BLOCK#1 defined by the non-volatile memory devices NAND included in the first non-volatile memory device group GP1.

The first ROM code ROM_CODE1 executed in the SSD controller 310 may store the first full-firmware in the DRAM device 360. When the first full-firmware downloaded to the DRAM device 360 includes a first boot loader, the first boot loader performs operations S228, S230, S232, S246, S250, S254, and S266 described above with reference to FIGS. 14 and 15. When the first full-firmware downloaded to the DRAM device 360 does not include the first boot loader, the first ROM code ROM_CODE1 executed in the SSD controller 310 performs operations S228, S230, S232, S246, S250, S254, and S266.

Operations S228, S230, S232, S246, S250, S254, and S266 may be used in the method of eliminating firmware discrepancy illustrated in FIGS. 16B and 16C. As a result, the SSD controller 310 and the scale-out storages 510 through 540 have the same optimal version of firmware.

Referring to FIG. 16B, the SSD controller 310 may allow the SSD controller 310 and the scale-out storages 510 through 540 to have the same version of firmware using a version VERA (=VER2) of the firmware of the scale-out storage 510. Referring to FIG. 16C, the SSD controller 310 may allow the SSD controller 310 and the scale-out storages 510 through 540 to have the same version of firmware using the version VERA (=VER1) of the firmware of the scale-out storage 540.

As described above, according to some embodiments of the present disclosure, a data processing system that includes controllers which use different versions of firmware coordinates and controls the booting sequence and download sequence of the firmware, thereby synchronizing the firmware among the controllers and allowing the controllers to have the same version of firmware.

Memories described herein are tangible storage mediums that can store data and executable instructions, and are non-transitory during the time instructions are stored therein. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A memory described herein is an article of manufacture and/or machine component. Memories described herein are computer-readable mediums from which data and executable instructions can be read by a computer.

While the concepts described herein have been particularly shown and described with reference to exemplary embodiments thereof, it will be understood by those of ordinary skill in the art that various changes in forms and details may be made therein without departing from the spirit and scope of the concepts as defined by the following claims.

What is claimed is:

1. A data storage device, comprising:
    a first volatile memory device;
    a first scale-out storage;
    a first controller configured to control the first volatile memory device and the first scale-out storage and to execute first firmware, and
    a power management integrated circuit configured to supply a second operating voltage to the first scale-out storage at a second supply point and supply a first operating voltage to the first controller at a first supply point, wherein the second supply point comes earlier than the first supply point;

wherein the first scale-out storage comprises:
a second volatile memory device;
a first non-volatile memory device; and
a second controller configured to control the second volatile memory device and the first non-volatile memory device and to execute second firmware,
wherein the first controller is coordinated to boot the first firmware after booting of the second firmware is completed by the second controller.

2. The data storage device of claim 1, wherein the first non-volatile memory device comprises:
a first block configured to store second full-firmware which comprises a second boot loader and the second firmware; and
a second block configured to store first full-firmware which comprises the first firmware, the second boot loader, and the second firmware.

3. The data storage device of claim 2,
wherein the first non-volatile memory device comprises a plurality of memory cells and each of the memory cells is either of a two-dimensional memory cell and a three-dimensional memory cell.

4. The data storage device of claim 2,
wherein the second controller loads the second boot loader from the first block to the second controller in response to a first physical read command output from the first controller, transmits the first full-firmware from the second block to the first controller using the second boot loader, and loads the second firmware from the first block to the second controller using the second boot loader, and
wherein commands involved in the transmission of the first full-firmware are second physical read commands including the first physical read command.

5. The data storage device of claim 4,
wherein the second controller loads the second boot loader from the first block to the second controller without using the second volatile memory device, initializes the second volatile memory device using the second boot loader, transmits the first full-firmware to the first controller via the second volatile memory device, and loads the second firmware to the second controller via the second volatile memory device.

6. The data storage device of claim 2,
wherein the first controller stores the first full-firmware transmitted from the second controller in the first volatile memory device, changes its own operating mode from a physical mode operating based on a physical address to a logical mode operating based on a logical address, and transmits an execution command to execute the second firmware to the second controller.

7. The data storage device of claim 6,
wherein the second controller executes the second firmware in response to the execution command and transmits an indicator signal indicating the execution of the second firmware to the first controller, and
wherein the first controller loads the first firmware included in the first full-firmware stored in the first volatile memory device in response to the indicator signal and executes the first firmware.

8. The data storage device of claim 7,
wherein the first controller which executes the first firmware transmits a version check command to the second controller and the second controller transmits version information of the second firmware to the first controller in response to the version check command.

9. The data storage device of claim 1, wherein the first controller is configured to perform operations comprising:
receiving first full-firmware which comprises the first firmware, a second boot loader, and the second firmware from an external device connected to the first controller;
storing the first full-firmware in the first volatile memory device;
changing its own operating mode from a physical mode operating based on a physical address to a logical mode operating based on a logical address; and
transmitting the second boot loader to the second controller using a first logical command, and
wherein the second controller initializes the second volatile memory device using the second boot loader.

10. The data storage device of claim 9,
wherein the first controller transmits second full-firmware which comprises the second boot loader and the second firmware to the second controller using a second logical command,
wherein the second controller writes the second full-firmware to a first block of the first non-volatile memory device via the second volatile memory device,
wherein the first controller transmits the first full-firmware to the second controller using a third logical command, and
wherein the second controller writes the first full-firmware to a second block of the first non-volatile memory device via the second volatile memory device.

11. The data storage device of claim 10,
wherein the first controller transmits an execution command indicating execution of the second firmware to the second controller, and
wherein the second controller loads and executes the second firmware included in the second full-firmware stored in the second volatile memory device in response to the execution command and transmits an indicator signal indicating that the second firmware is executed to the first controller; and
wherein the first controller loads the first firmware included in the first full-firmware stored in the first volatile memory device in response to the indicator signal and executes the first firmware.

12. The data storage device of claim 9,
wherein the external device is either of a host and a second scale-out storage, and
wherein the second scale-out storage comprises:
a third volatile memory device;
a second non-volatile memory device configured to store the first full-firmware; and
a third controller configured to control the third volatile memory device and the second non-volatile memory device.

13. The data storage device of claim 1,
wherein the first controller comprises first general-purpose input/output (GPIO) pins; wherein the second controller comprises second GPIO pins;
wherein the first GPIO pins are connected with the second GPIO pins, respectively; and
wherein each of the first and second controllers checks a state of one of the first GPIO pins and determines whether an operating mode of the data storage device is a boot mode or a download mode.

14. The data storage device of claim 13,
wherein the first non-volatile memory device comprises:
 a first block configured to store second full-firmware which comprises a second boot loader and the second firmware; and
 a second block configured to store first full-firmware which comprises the first firmware, the second boot loader, and the second firmware, and
wherein when the operating mode is the boot mode, the second controller transmits the first full-firmware stored in the second block to the first controller, loads the second firmware stored in the first block to the second controller, executes the second firmware in response to an execution command indicating execution of the second firmware, transmits an indicator signal indicating that the second firmware is executed to the first controller; and the first controller downloads the first firmware included in the first full-firmware in response to the indicator signal and executes the first firmware.

15. The data storage device of claim 13,
wherein the first non-volatile memory device comprises a first block and a second block, and
wherein when the operating mode is the download mode, the first controller receives first full-firmware which comprises the first firmware, a second boot loader, and the second firmware from an external device connected to the first controller, stores the first full-firmware in the first volatile memory device, and transmits second full-firmware which comprises the second boot loader and the second firmware to the second controller;
the second controller writes the second full-firmware to the first block;
the first controller transmits the first full-firmware to the second controller;
the second controller writes the first full-firmware to the second block, executes the second firmware in response to an execution command output from the first controller to indicate execution of the second firmware, and transmits an indicator signal indicating that the second firmware is executed to the first controller; and
the first controller downloads the first firmware included in the first full-firmware stored in the first volatile memory device in response to the indicator signal and executes the first firmware.

16. A data storage device, comprising:
a first volatile memory device;
scale-out storages; and
a first controller configured to control the first volatile memory device and the scale-out storages,
wherein each of the scale-out storages comprises:
 a second volatile memory device;
 a non-volatile memory device; and
 a second controller configured to control the second volatile memory device and the non-volatile memory device,
wherein the first controller executes first firmware, the second controller included in each scale-out storage executes second firmware, and the first controller is coordinated to execute the first firmware after the second firmware is executed by each of second controllers included in the scale-out storages,
wherein the first controller executes the first firmware in response to a last indicator signal among indicator signals each of which indicates that the second firmware is executed by a corresponding one of the second controllers and the indicator signals are transmitted respectively by the second controllers to the first controller.

17. The data storage device of claim 16,
wherein the first controller transmits a version check command to the second controllers and each of the second controllers transmits version information of the second firmware to the first controller in response to the version check command.

18. A data processing system, comprising:
a host; and
a data storage device connected to the host,
wherein the data storage device comprises:
 a first volatile memory device;
 a scale-out storage;
 a first controller configured to control the first volatile memory device and the scale-out storage and to execute first firmware, and
 a power management integrated circuit configured to supply a second operating voltage to the scale-out storage at a second supply point and supply a first operating voltage to the first controller at a first supply point, wherein the second supply point comes earlier than the first supply point;
wherein the scale-out storage comprises:
 a second volatile memory device;
 a non-volatile memory device; and
 a second controller configured to control the second volatile memory device and the non-volatile memory device and to execute second firmware, and
wherein the first controller is coordinated to boot the first firmware after booting of the second firmware is completed by the second controller.

* * * * *